(12) United States Patent
Subramaniam

(10) Patent No.: US 7,577,547 B2
(45) Date of Patent: Aug. 18, 2009

(54) JACOBIAN SCALING PARAMETER SYSTEM AND METHOD FOR AUTOMATIC GRID GENERATION

(75) Inventor: Shankar Subramaniam, Vernon, CT (US)

(73) Assignee: Concepts ETI, Inc., Wilder, VT (US)

( * ) Notice: Subject to any disclaimer, the term of this patent is extended or adjusted under 35 U.S.C. 154(b) by 0 days.

(21) Appl. No.: 11/958,192

(22) Filed: Dec. 17, 2007

(65) Prior Publication Data

US 2008/0147352 A1    Jun. 19, 2008

Related U.S. Application Data

(60) Provisional application No. 60/870,263, filed on Dec. 15, 2006, provisional application No. 60/953,200, filed on Jul. 31, 2007.

(51) Int. Cl.
*G01B 3/22* (2006.01)
(52) U.S. Cl. ..................... 702/167
(58) Field of Classification Search ........... 702/167; 703/2
See application file for complete search history.

(56) References Cited

U.S. PATENT DOCUMENTS

| | | | |
|---|---|---|---|
| 5,903,458 A * | 5/1999 | Stewart et al. ......... 700/98 |
| 5,991,526 A | 11/1999 | Igarashi |
| 6,356,860 B1 | 3/2002 | Barnette |
| 6,804,635 B1 | 10/2004 | Dhondt |
| 6,876,956 B1 | 4/2005 | Cirak et al. |
| 2001/0041971 A1 | 11/2001 | Syo |
| 2002/0029135 A1 | 3/2002 | Hollig et al. |
| 2002/0167518 A1 | 11/2002 | Migdal et al. |
| 2004/0034514 A1 | 2/2004 | Langemyr et al. |
| 2006/0212278 A1 | 9/2006 | Hirai |
| 2006/0277008 A1 | 12/2006 | Suresh |
| 2008/0143717 A1 | 6/2008 | Subramaniam |
| 2008/0147351 A1 | 6/2008 | Subramaniam |
| 2008/0147758 A1 | 6/2008 | Subramaniam |

OTHER PUBLICATIONS

Beader, Jim, "Computational Fluid Dynamics", Class Handouts, University of Maryland, Spring 2005.

Sorenson, Resse L., "A Computer Program to Generate Two-Dimension Grids About Airfoils and Other Shapes by the Use of Poisson's Equation", NASA Technical Memorandum, May 1980.

White, J. A. AIAA 90-1568, "Elliptic Grid Generation With Orthogonality And Spacing Control On An Arbitrary Number Of Boundaries", AIAA 21st Fluid Dynamics, Plasma Dynamics and Lasers Conference, Seattle, WA, pp. 1-13, Jun. 1990.

(Continued)

*Primary Examiner*—Drew A Dunn
*Assistant Examiner*—Stephen J Cherry
(74) *Attorney, Agent, or Firm*—Downs Rachlin Martin PLLC

(57) ABSTRACT

A system and method for automatically generating a computation mesh for use with an analytical tool, the computation mesh having a plurality of $\xi$-grid lines and $\eta$-grid lines intersecting at grid points positioned with respect to an inner boundary and an outer boundary. The method includes receiving from a user information corresponding to a shape to be analyzed using the analytical tool and solving one or more mesh equation for a plurality of point locations, the one or more mesh equations depending on a source Jacobian scaling parameter that is not equal to 2.

16 Claims, 20 Drawing Sheets

OTHER PUBLICATIONS

Christov, C. I., "Orthogonal Coordinate Meshes with Manageable Jacobian", Numerical Grid Generation, Ed. Joe F. Thompson, Elsevier Science Publishing Company, Inc., p. 885-894 (1982).
Eiseman, Peter R., "Automatic Algebraic Coordinate Generation", Numerical Grid Generation, Ed. Joe F. Thompson, Elsevier Elsevier Science Publishing Company, Inc., p. 447-463 (1982).
Gordon, William J., "Transfinite Mappings and Their Application to Grid Generation", Numerical Grid Generation, Ed. Joe F. Thompson, Elsevier Science Publishing Company, Inc., p. 171-233 (1982).
Halsey, Douglas, "Conformal Grid Generation for Multielement Airfoils", Numerical Grid Generation, Ed. Joe F. Thompson, Elsevier Science Publishing Company, Inc., p. 585-600 (1982).
Smith, Robert E., "Algebraic Grid Generation", Numerical Grid Generation, Ed. Joe F. Thompson, Elsevier Science Publishing Company, Inc., p. 137-170 (1982).
Ives, David C., "Conformal Grid Generation", Numerical Grid Generation, Ed. Joe F. Thompson, Elsevier Science Publishing Company, Inc., p. 107-135 (1982).
Thompson, Joe F., "Elliptic Grid Generation", Numerical Grid Generation, Ed. Joe F. Thompson, Elsevier Science Publishing Company, Inc., p. 79-105 (1982).
Thompson, Joe F., "General Curvilinear Coordinate Systems", Numerical Grid Generation, Ed. Joe F. Thompson, Elsevier Science Publishing Company, Inc., p. 1-30 (1982).
Kerlick, G. David, "Assessing the Quality of Curvilinear Coordinate Meshes", Numerical Grid Generation, Ed. Joe F. Thompson, Elsevier Science Publishing Company, Inc., p. 787-807 (1982).
Mastin, C. Wayne, "Error Induced By Coordinate Systems", Numerical Grid Generation, Ed. Joe F. Thompson, Elsevier Science Publishing Company, Inc., p. 31-40 (1982).
Shubin, G.R., "Three Dimensional Grid Generation Using Biharmonics", Numerical Grid Generation, Ed. Joe F. Thompson, Elsevier Science Publishing Company, Inc., p. 761-774 (1982).
Sorenson, Reese L., "Grid Generation By Elliptic Partial Differential Equations for a Tri-Element Augmentor-Wing Airfoil", Numerical Grid Generation, Ed. Joe F. Thompson, Elsevier Science Publishing Company, Inc., p. 653-665 (1982).
Steger, Joseph L., "On Application of Body Conforming Curvilinear Grids for Finite Difference Solution of External Flow", Numerical Grid Generation, Ed. Joe F. Thompson, Elsevier Science Publishing Company, Inc., p. 295-316 (1982).
Thames, Frank C., "Generation of Three-Dimensional Boundary-Fitted Curvilinear Coordinate Systems for Wing/Wing-tip Geometries Using the Elliptic Solver Method", Numerical Grid Generation, Ed. Joe F. Thompson, Elsevier Science Publishing Company, Inc., p. 695-716 (1982).
Thomas, P. D., "Numerical Generation of Composite Three Dimensional Grids", Numerical Grid Generation, Ed. Joe F. Thompson, Elsevier Science Publishing Company, Inc., p. 667-686 (1982).
Warsi, U. A., "Basic Differential Models for Coordinate Generation", Numerical Grid Generation, Ed. Joe F. Thompson, Elsevier Science Publishing Company, Inc., p. 41-77 (1982).
Roache, Patrick J., "Application of a Single-Equation MG-FAS Solver to Elliptic Grid Generation Equations (Subgrid and Supergrid Coefficient Generation)", Applied Mathematics and Computation, Elsevier Science Publishing Company, Inc., vol. 19, pp. 238-292 (1986).
Warsi, Z. U. A., "A Synopsis of Elliptic PDE Models for Grid Generation", Applied Mathematics and Computation, Elsevier Science Publishing Company, Inc., vol. 21, pp. 293-311 (1987).
Soni, B. K., "The Enhancement of an Elliptic Grid Using Appropriate Control Functions", Applied Mathematics and Computation, Elsevier Science Publishing Company, Inc., vol. 159, pp. 809-821 (2004).
Soni, B. K., "Elliptic Grid Generation System: Control Functions Revisited—I", Applied Mathematics and Computation, Elsevier Science Publishing Company, Inc., vol. 59, pp. 151-163 (1993).
Conti, Costanza, "An Algebraic-Elliptic Algorithm for Boundary Orthogonal Grid Generation", Applied Mathematics and Computation, Elsevier Science Publishing Company, Inc., vol. 162, pp. 15-27 (2005).
Bourchtein, Andrei, "On Generation of Orthogonal Grids", Applied Mathematics and Computation, Elsevier Science Publishing Company, Inc., vol. 173, pp. 767-781 (2006).
Soni, Bharat K., "Grid Generation: Past, Present and Future", Applied Numerical Mathematics, vol. 32, pp. 361-369 (2000).
Barrera-Sanchez, Pablo, "Some Experiences on Orthogonal Grid Generation", Applied Numerical Mathematics, vol. 40, pp. 179-190 (2002).
Eiseman, Peter R., "Grid Generation for Fluid Mechanics Computations", Annual Reviews Fluid Mechanics, vol. 17, pp. 487-522 (1985).
Chima, R. V., "Comparison of the AUSM+ and H-CUSP Schemes for Turbomachinery Applications", NASA Glenn Research Center, available at http://gltrs.grc.nasa.gov/reports/2603/TM-2003-212457.pdf. Last visited on Feb. 9, 2009.
Khattri. S. K., 2006d. "Adaptive Quadrilateral Mesh in Curved Domains", available at http:/www.mi.uib.no/~sanjay/RESEARCH_/ELLIPTIC_GRID_/Documentation_/Main_MS.pdf.
Kawata, S., "Grid Generation with Orthogonality and Uniformity of Line-Spacing Changing Ratio", Computer Physics Communications, vol. 94, pp. 19-24 (1996).
Lin, Kai-Lung, "Two-Dimensional Orthogonal Grid Generation Techniques", Computers & Structures, vol. 41, No. 4, pp. 569-583 (1991).
Hilgenstock, A., "A Fast Method for the Elliptic Generation of Three-Dimensional Grids with Full Boundary Control", Numerical Grid Generation in Computational Fluid Mechanics '88, Pineridge Press Limited, pp. 137-146 (1988).
Brakhage, Karl-Heinz, "Algebraic-Hyperbolic Grid Generation with Precise Control of Intersection of Angles", International Journal for Numerical Methods in Fluids, vol. 33, pp. 89-123 (2000).
Zhou, Quanbao, "A Simple Grid Generation Method", International Journal for Numerical Methods in Fluids, vol. 26, pp. 713-724 (1998).
Beale, S. B., "A Finite Volume Method for Numerical Grid Generation", International Journal for Numerical Methods in Fluids, vol. 30, pp. 523-540 (1999).
Kim, Sungcho, "Control Functions and Grid Qualities Measurements in the Elliptic Grid Generation Around Arbitrary Surfaces", International Journal for Numerical Methods in Fluids, vol. 33, pp. 81-88 (2000).
Lehtimaki, Reijo, "An Algebraic Boundary Orthogonalization Procedure for Structured Grids", International Journal for Numerical Methods in Fluids, vol. 32, pp. 605-618 (2000).
Zhang, Yaoxin, "2D Nearly Orthogonal Mesh Generation", International Journal for Numerical Methods in Fluids, vol. 46, pp. 685-707 (2004).
Zhang, Yaoxin, "Structured Mesh Generation with Smoothness Controls", International Journal for Numerical Methods in Fluids, available at http://www.interscience.wiley.com.
Warsi, Z. U. A., "Numerical Mapping of Arbitrary Domains Using Spectral Methods", Journal of Computational Physics, vol. 104, pp. 251-262 (1993).
Eca, Luis, "2D Orthogonal Grid Generation with Boundary Point Distribution Control", Journal of Computational Physics, vol. 125, pp. 440-453 (1996).
Hagmeijer, R., "Grid Adaptation Based on Modified Anisotropic Diffusion Equations Formulated in the Parametric Domain", Journal of Computational Physics, vol. 115, pp. 169-183 (1994).
Sethian, J. A., "Curvature Flow and Entropy Conditions Applied to Grid Generation", Journal of Computational Physics, vol. 115, pp. 440-454 (1994).
Soong, C. Y., "A Novel Hyperbolic Grid Generation Procedure with Inherent Adaptive Dissipation", Journal of Computational Physics, vol. 116, pp. 173-179 (1995).
Spekreijse, S. P., Elliptic Grid Generation Based on Laplace Equations and Algebraic Transformations, Journal of Computational Physics, vol. 118, pp. 38-61 (1995).
Kang, I. S., "A Non-iterative Scheme for Orthogonal Grid Generation with Control Function and Sepcified Boundary Correspondence on Three Sides", Journal of Computational Physics, vol. 112, pp. 138-148 (1994).

Khamayseh, Ahmed, "Computational Conformal Mapping for Surface Grid Generation", Journal of Computational Physics, vol. 123, pp. 394-401 (1996).

Ivanenko, S. A., "A Variational Form of the Winslow Grid Generator", Journal of Computational Physics, vol. 136, pp. 385-398 (1997).

Akcelik, Volkan, "Nearly Orthogonal Two-Dimensional Grid Generation with Aspect Ration Control", Journal of Computational Physics, vol. 171, pp. 805-821 (2001).

Castillo, Jose E., "Mathematical Aspects of Variational Grid Generation II", Journal of Computational and Applied Mathematics, vol. 20, pp. 127-135 (1987).

Castillo, Jose, "Solution Adaptive Direct Variational Grids for Fluid Flow Calculations", Journal of Computational and Applied Mathematics, vol. 67, pp. 343-370 (1996).

Brackhill, J. U., "An Adaptive Grid with Directional Control", Journal of Computational Physics, vol. 108, pp. 38-50 (1993).

Knupp, P., "Mesh Generation Using Vector-Fields", Journal of Computational Physics, vol. 119, pp. 142-148 (1995).

Huang, Weizhang, "Variational Mesh Adaptation: Isotropy and Equidistribution", Journal of Computational Physics, vol. 174, pp. 903-924 (2001).

Cao, Weiming, "A Study of Monitor Functions for Two-Dimensional Adaptive Mesh Generation", Siam J. Sci Comput., vol. 20, No. 6, pp. 1978-1994 (1999).

Thompson, Joe F., "Numerical Grid Generation Foundations and Applications", published by Joe F. Thompson in 1997, available at http://www.hpc.msstate.edu/publications/gridbook/index.html. Last visited on Feb. 9, 2009. * (Previous publication by Elsevier, 1985).

Wild, Jochen, "Marching Generation of Smooth Structured and Hybrid Meshes Based on Metric Identity", Proceedings, 14th International Meshing Roundtable, Springer-Verlag, pp. 109-128, Sep. 11-14, 2005.

Hou, Thomas, "An Efficient Dynamically Adaptive Mesh for Potentially Singular Solutions", Journal of Computational Physics, vol. 172, 609-639 (2001).

Niederdrenk, Peter, "On the Control of Elliptic Grid Generation", Proceedings of the 6th International Conference on Numerical Grid Generation in Computational Field Simulations at Univeristy of Greenwich, Jul. 6-9, 1998.

Niederdrenk, Peter, "Controlled Parabolic Marching Grid Generation", Proceedings of the 7th International Conference on Numerical Grid Generation in Computational Field Simulations in Whistler, B.C., Canada, pp. 29-38, Sep. 25-28, 2000.

Niederdrenk, Peter, "Elliptic Grid Control on a Discrete Level", Proceedings of the 8th International Meshing Roundtable in South Lake Tahoe, California, pp. 23-29 (1999).

Steinbrenner, John P., "Gridgen's Implementation of Partial Differential Equation Based Structured Grid Generation Methods", Proceedings of the 8th International Meshing Round Table in South Lake Tahoe, California, (1999) Available at http://citeseerx.ist.psu.edu/viewdoc/summary?doi=10.1.35.899.

Gridgen Technical Specifications Publication Sheets (2005).

Molar, Cleve, "Interpolation", Numerical Computing with MATLAB, Chapter 3 (2004).

Ahmad, Mohiuddin, "Interpolation II", PowerPoint Presentation, Computer Vision and Pattern Recognition Lab, Dept. of Computer Science and Engineering at Korea University, May 11, 2005.

Floater, Michael S., "Parameterization for Curve Interpolation", Topics in Multivariate Approximation and Interpolation, pp. 105-115 (2005).

Ramos, Gonzalo, A., "Scattered Data Interpolation Using An Alternative Differential Equation Interpolant", Thesis Statement of Gonzalo Ramos, University of Toronto (2001).

Brette, Romain, "Piecewise-Polynomial Interpolation", available at http://www.di.ens.fr/~brette/calculscientifique/index.htm. Last visited on Feb. 9, 2009.

Meijering, Erik, "A Chronology of Interpolation: From Ancient Astronomy to Modern Signal and Image Processing", Proceedings of the IEEE, vol. 90, No. 3, Mar. 2002.

Shekhtman, Boris, "On Hermite Interpolation In Rd", Electronic Transactions on Numerical Analysis, vol. 18, pp. 65-72 (2004).

Pulliam, Thomas, H., "A Computational Challenge: Euler Solution For Ellipses", NASA, Ames Research Center, Moffett Field, CA AIAA-1989-469 Aerospace Sciences Meeting, 27th, Reno, NV, Jan. 9-12, 1989.

Codd, Andrea L., "Elasticity-Fluid Coupled Systems and Elliptic Grid Generation (EGG) based on First-Order System Least Square (FOSLS)", Thesis Statement of Andrea Codd, University of Colorado, 2002.

Fedosenko, N., "Applications of Exact Solutions of Some Elliptic Equations for Generation of Two- and Multidimensional Analytical Grids", Proceedings of Algoritmy, Conference on Scientific Computing, pp. 253-259 (2002).

Filipiak, Mark, "Mesh Generation", Edinburgh Parallel Computing Centre, University of Edinburgh, Version 1.0, Nov. 1996.

Dijk, Jan van, "The Plasimo Grid", Apr. 2003, available at plasimo.phys.tue.nl/documentation/plgrid.pdf. Last visited on Feb. 9, 2009.

Hauser, Jochem, "Modern Introduction to Grid Generation", COSMASE Shortcourse Notesk EPF Lausanne, Salzgitter, Deutschland (1996).

Jones, William T., "Efficient Smoothing and Deformation of Structured Volume Grids", Proceedings of the 7th International Conference on Numerical Grid Generation in Computational Field Simulation, University of Greenwich, UK (1998).

Akcelik, Volkan, "Nearly Orthogonal Two-Dimensional Grid Generation with Aspect Ratio Control", Journal of Computational Physics, vol. 171, pp. 805-821 (2001).

Flaherty, Joseph E., "Chapter 8: Elliptic Problems", available at www.cs.rpi.edu/~flaherje/pdf/pde8.pdf. Last visited on Feb. 9, 2009.

Persson, Per-Olof, "Mesh Generation for Implicit Geometries", Department of Mathematics, Massachusetts Institute of Technology (2004), available at www-math.mit.edu/~persson/thesis/person-thesis-presentation.pdf.

Tinoco-Ruiz, Jose-Gerardo, "Some Properties of Area Functionals in Numerical Grid Generation", Proceedings, 10th International Meshing Roundtable, Sandia National Laboratories, pp. 43-54, Oct. 7-10, 2001.

Hemker, P. W., "Multigrid Methods: Development of Fast Solvers", Applied Mathematics and Computation, Elsevier Science Publishing Company, Inc., vol. 13, pp. 311-326 (1983).

Thames, Frank C., "Multigrid Applications to Three-Dimensional Elliptic Coordinate Generation", Applied Mathematics and Computation, Elsevier Science Publishing Company, Inc., vol. 15, pp. 325-342 (1984).

Thole, Clemens-August, "Basic Smoothing Procedures for the Multigrid Treatment of Elliptic 3D Operators", Applied Mathematics and Computation, Elsevier Science Publishing Company, Inc., vol. 19, pp. 333-345 (1986).

Spitaleri, R. M., "A Multigrid Method for Grid Generation with Line-Spacing Control", Applied Mathematics and Computation, Elsevier Science Publishing Company, Inc., vol. 40, pp. 125-134 (1990).

Spitaleri, R. M., "Multiblock Multigrid Grid Generation Algorithms: Overcoming Multigrid Anisotropy", Applied Mathematics and Computation, Elsevier Science Publishing Company, Inc., vol. 84, pp. 247-267 (1997).

Yavneh, Irad, "Multigrid Smoothing for Symmetric Nine-Point Stencils", Applied Mathematics and Computation, Elsevier Science Publishing Company, Inc., vol. 92, pp. 229-246 (1998).

Moitra, Stuti, "Parallel Grid Generation Algorithm for Distributed Memory Computers", NASA Technical Paper 3429, Feb. 1994.

Eiseman, Peter R., "Geometric Methods in Computational Fluid Dynamics", Institute for Computer Applications in Science and Engineering, NASA Langley Research Center, Report No. 80-11, Apr. 18, 1980.

Thompson, Joe F., "Boundary-Fitted Curvilinear Coordinate Systems for Solution of Partial Differential Equations on Fields Containing any Number of Arbitrary Two-Dimensional Bodies", NASA Contractor Report, CR-2729 (1977).

Beach, Timothy A., "An Interactive Grid Generation Procedure for Axial and Radial Flow Turbomachinery", NASA Contractor Report 185167, AIAA-90-0344 (1989).

Mastin, C. Wayne, "Transformation of Two and Three-Dimensional Regions by Elliptic Systems", NASA Contractor Report CR-195849, May 4, 1994.

Kaul, Upender K., "Elliptic Grid Generation of Spiral-Bevel Pinion Gear Typical of OH-58 Helicopter Transmission", Ames Research Center, Moffett Field, California (2002).

Branets, L., "A Local Cell Quality Metric and Variational Grid Smoothing Algorithm", Proceedings, 12th International Meshing Roundtable, Sandia National Laboratories, pp. 371-390, Sep. 2003.

Branets, Larisa, "Smoothing and Adaptive Redistribution for Grids with Irregular Valence and Hanging Nodes", Proceedings, 13th International Meshing Roundtable, Sandia National Laboratories, pp. 333-344, Sep. 2004.

Canann, Scott A., "An Approach to Combined Laplacian and Optimization-Based Smoothing for Triangular, Quadrilateral, and Quad-Dominant Meshes", 7th International Meshing Roundtable, Sandia National Laboratories, pp. 479-494, Oct. 1998.

Chen, Zhijian, "Combined Laplacian and Optimization-Based Smoothing for Quadratic Mixed Surface Meshes", Proceedings, 12th International Meshing Roundtable, Sandia National Laboratories, pp. 201-213, Sep. 2003.

Freitag, Lori, "An Efficient Parallel Algorithm for Mesh Smoothing", Proceedings, 4th International Meshing Roundtable, Sandia National Laboratories, pp. 47-58, Oct. 1995.

Jansen, K. E., "On Anisotropic Mesh Generation and Quality Control in Complex Flow Problems", Proceedings, 10th International Meshing Roundtable, Sandia National Laboratories, pp. 341-349, Oct. 7-10, 2001.

Knupp, Patrick M., "Winslow Smoothing on Two-Dimensional Unstructured Meshes", Proceedings, 7th International Meshing Roundtable, Sandia National Laboratories, pp. 449-457, Oct. 1998.

Shontz, Suzanne M., "A Mesh Warping Algorithm Based on Weighted Laplacian Smoothing", Proceedings, 12th International Meshing Roundtable, Sandia National Laboratories, pp. 147-157, Sep. 2003.

Anderson, Dale A., "Equidistribution Schemes, Poisson Generators, and Adaptive Grids", Applied Mathematics and Computation, Elsevier Science Publishing Company, Inc., vol. 24, pp. 211-227 (1987).

Saltzman, Jeffery, "Applications and Generalizations of Variational Methods for Generating Adaptive Meshes", Numerical Grid Generation, Joe. F. Thompson, Elsevier Science Publishing Company, Inc., p. 865 (1982).

Brackbill, J. U., "Coordinate System Control: Adaptive Meshes", Numerical Grid Generation, Joe. F. Thompson, Elsevier Science Publishing Company, Inc., p. 277 (1982).

Castillo, Jose, "Parameter Estimation in Variational Grid Generation", Applied Mathematics and Computation, Elsevier Science Publishing Company, Inc., vol. 28, pp. 155-177 (1988).

Garanzha, V. A., "Metric Control of Spatial Mappings", available at www.ccas.ru/gridgen/ggta02/abstracts/Garanzha.pdf, last visited Feb. 9, 2009.

Sjögreen, Björn, Lecture Notes on Grid Generation, Scientific Computing 2D1263, Royal Institute of Technology, Sweden, Jan. 29, 2004. Available at http://www.nada.kth.se/kurser/kth/2D1263/13.pdf. Last visited on Feb. 9, 2009.

International Search Report and Written Opinion dated May 13, 2008, regarding related PCT Application Serial No. PCT/US07/87810.

International Search Report and Written Opinion dated May 13, 2008, regarding related PCT Application Serial No. PCT/US07/87816.

Article 19 Amendment dated Jul. 10, 2008, regarding related PCT Application Serial No. PCT/US07/87816.

First Office Action dated Oct. 7, 2008, regarding related U.S. Appl. No. 11/958,170.

Response to Office Action dated Feb. 9, 2009, regarding related U.S. Appl. No. 11/958,170.

Reese L. Sorenson, A Computer Program to Generate Two-Dimensional Grids About Airfoils and Other Shapes by the Use of Poisson's Equation, NASA Technical Memorandum 81198, May 1980, pp. 1-58.

Upender K. Kaul, New Boundary Constraints for Elliptic Systems Used in Grid Generation Problems, Journal of Computational Physics, 189 (2003) pp. 476-492.

* cited by examiner

Robustness of the Jacobian Scaling Method

Shear transformations of A

A (Cascade 2)   B   C

JACOBIAN SCALING PARAMETER SYSTEM AND METHOD FOR AUTOMATIC GRID GENERATION

RELATED APPLICATION DATA

This application claims the benefit of priority of U.S. Provisional Patent Application Ser. No. 60/870,263, filed Dec. 15, 2006, and titled Automatic Elliptic Grid Generation, that is incorporated by reference herein in its entirety. This application also claims priority to U.S. Provisional Patent Application Ser. No. 60/953,200, filed Jul. 31, 2007, and titled Jacobian Scaling Parameter System and Method for Automatic Grid Generation. Each of these applications is incorporated herein by reference in its entirety.

This application is also related to commonly-owned U.S. patent application Ser. No. 11/958,170, entitled "Source Decay Parameter System and Method for Automatic Grid Generation;" Ser. No. 11/958,125, entitled "First-Point Distance Parameter System and Method for Automatic Grid Generation;" and Ser. No. 11/958,209, entitled "Variational Error Correction System and Method for Automatic Grid Generation," each of which are filed on the same day as this application: Dec. 17, 2007, each of which is incorporated herein in its entirety.

FIELD OF THE INVENTION

The present invention generally relates to the field of automatic grid generation. In particular, the present invention is directed to a Jacobian scaling system and method for automatic grid generation for use with analytical tools.

BACKGROUND

Various techniques have been implemented for problems that require grid generation around complex geometries. Although these techniques achieve a certain level of success, they are often inadequate when faced with difficult geometries, such as, airfoils, turbine blades and other aerodynamically designed surfaces. Analyzing these shapes requires the most complex and time-consuming methodologies. Often, these methods use elliptic grid generation formulas that include variables selected and iteratively modified by the user in an effort to achieve the most ideal grid. Because these inputs are typically not completely independent, changes to one input will require modifications to others, thus increasing the permutations of manually entered selections necessary to generate a quality grid. Overall, the variability of these methods increases process time and ultimately impacts overall design and development operations. It is desirable to have a grid generation technique that can robustly handle complex geometries in an automated way using minimal user interface.

SUMMARY OF THE DISCLOSURE

In one implementation, a computer-implemented method for automatically generating a computation mesh for use with an analytical tool, the computation mesh having a plurality of $\xi$-grid lines and $\eta$-grid lines intersecting at grid points positioned with respect to an inner boundary and an outer boundary, is provided. The method includes receiving from a user information corresponding to a shape to be analyzed using the analytical tool; solving one or more mesh equations for a plurality of point locations, the one or more mesh equations depending on a Jacobian scaling parameter that is not equal to 2; generating the computation mesh as a function of the plurality of point locations; and outputting one or more indicia representing the computation mesh.

In another implementation, a system for generating a computation mesh for use with an analytical tool, the computation mesh including a plurality of $\xi$-grid lines and $\eta$-grid lines that intersect at grid points, the grid points positioned with respect to an inner boundary and an outer boundary, is provided. The system includes a means for receiving a shape to be analyzed using the analytical tool; a means for solving one or more mesh equations for a plurality of point locations, the computational means including a storage device having stored therein one or more mesh equations that depend on a Jacobian scaling parameter that is not equal to two; a means for generating the computation mesh as a function of the plurality of point locations; and a means for outputting one or more indicia representing the computation mesh.

In yet another implementation, a machine-readable medium containing machine readable instructions for performing a method of generating a computation mesh for use with an analytical tool, the computation mesh having a plurality of $\xi$-grid lines and $\eta$-grid lines that intersect at grid points positioned with respect to an inner boundary and an outer boundary, is provided. The instructions include a set of instructions for receiving from a user information corresponding to a shape to be analyzed using the analytical tool; a set of instructions for solving one or more mesh equation for a plurality of point locations, the one or more mesh equations depending on a Jacobian scaling parameter that is not equal to two; a set of instructions for generating the computation mesh as a function of the plurality of point locations; and a set of instructions for outputting one or more indicia representing the computational mesh.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

In one embodiment, a system and method are described herein for providing an automated process to generate a computation mesh using one or more mesh equations (e.g., mesh equations 3 and 4, described below). In one example, the automated process is made as automated as possible (e.g., the process does not require excessive interaction or additional modifications by a user of the computation mesh generation, such as the input of updated mesh parameters upon reiteration of one or mesh equations. Examples of a user modification, include, but are not limited to, a change to a source decay parameter, a change to a source term, a change to a first-point distance parameter, a change to a clustering parameter (e.g., a Kaul clustering parameter), and any combinations thereof. In another example, a fully automated process includes providing limited inputs to generate a computation mesh. Examples of inputs include, but are not limited to, a mesh parameter, a shape, and any combinations thereof. In one example, a computation mesh may be generated with only the input of information corresponding to a shape to be analyzed, a $\xi$-grid line mesh parameter value corresponding to a desired number of $\xi$-grid lines for the computation mesh, and an $\eta$-grid line mesh parameter value corresponding to a desired number of $\eta$-grid lines for the computation mesh. A computation mesh may include $\xi$-grid lines and $\eta$-grid lines intersecting in the space proximate a shape to be analyzed at grid points determined from one or mesh equations. $\xi$-grid lines and $\eta$-grid lines are discussed further below.

As will also be discussed further below, in one implementation, a system and method for generating a computation mesh may utilize one or more mesh equations (e.g., mesh equations 3 and 4 discussed further below) including a Jacobian scaling parameter that is not equal to 2. In one exemplary aspect, a Jacobian scaling parameter may be incorporated into one or more mesh equations that determine a grid location of one or more grid points of a computation mesh. A grid location is a spatial position within a computation domain of interest in a space proximate a shape to be analyzed. Examples of a grid location include, but are not limited to, a set of coordinates, a distance, a fraction of the overall length scale of the computation domain of interest and any combinations thereof.

Figure 1:
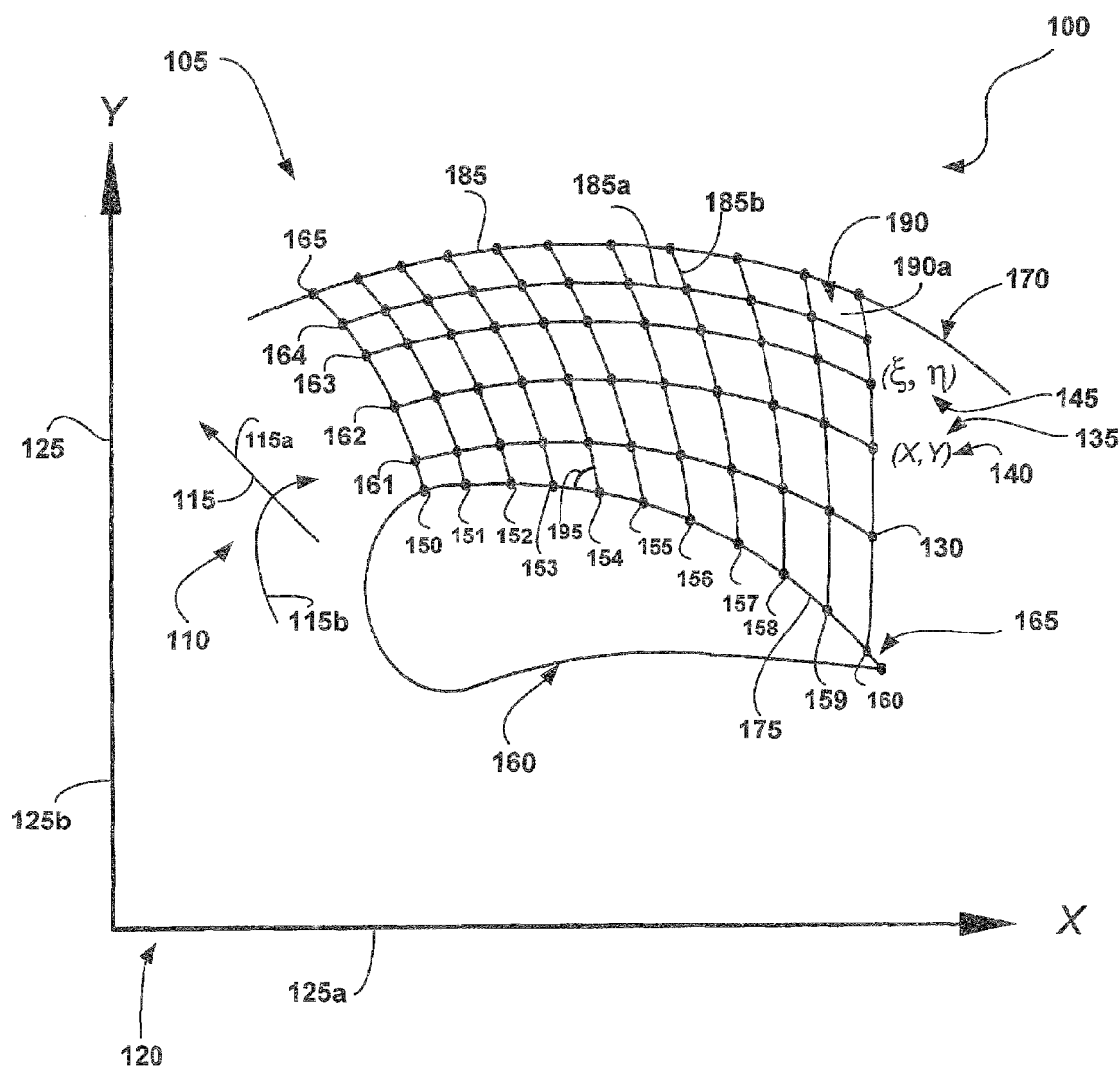
FIG. 1 illustrates one example of a computation mesh.

As discussed above, a Jacobian scaling parameter may be utilized as part of one or more mesh equations to generate a computation mesh. FIG. 1 illustrates an exemplary portion of a computation mesh 100 that includes a space 105. A space is an area around the shape to be analyzed. Examples of a space include, but are not limited to, a computation space, a physical space, a spherical space, a surface of revolution and any combinations thereof. In the present example, computation mesh 100 includes a computation space 110 having a set of computation axes 115, e.g., a $\xi$-axis 115a and a $\eta$-axis 115b. A set of computation axes provide a reference for a grid location, such as, a set of computation coordinates ($\xi,\eta$). A set of computation coordinates ($\xi,\eta$) can have values that correspond to a set of real numbers, a set of integers, and any combinations thereof. In one example, a set of computation coordinates ($\xi,\eta$) includes a set of integers (e.g., 1, 2, 3, . . . ).

Computation mesh 100 also includes a physical space 120 that has a set of physical axes 125, e.g., x-axis 125a and y-axis 125b. A set of physical axes provide a reference for a grid location, such as, a set of physical coordinates (x,y). A set of physical coordinates (x,y) can have values that correspond to a set of real numbers, a set of integers, and any combinations thereof. In one example, a set of physical coordinates (x,y) includes a set of integers (e.g., 1, 2, 3, . . . ).

Computation mesh 100 includes a plurality of grid points 130. Each of the plurality of grid points 130 have a grid location 135. A grid location (e.g., grid location 135) may be a position of a grid point in the space proximate the shape to be analyzed. Examples of a grid location include, but are not limited to, a set of physical coordinates, a set of computation coordinates, and any combinations thereof. In one example, a grid location includes a set of physical coordinates (x,y) 140. In another example, a grid location includes a set of computation coordinates ($\xi,\eta$) 145.

A mesh equation is a mathematical operation that includes one or more algorithms to determine the position of a grid point within a computation domain. Examples of a mesh equation include, but are not limited to, an algebraic grid equation, an elliptic grid equation, a structured mesh algorithm, a partial differential grid equation and any combinations thereof. In one example of a Jacobian scaling parameter system and method, the one or more mesh equations include one or more elliptic grid equations.

In one implementation, a coupled set of nonlinear Poisson equations (e.g., Equations 1 and 2 below) determine the position of a grid point within the grid of a computation mesh. These nonlinear Poisson equations form the basis for one or more exemplary mesh equations discussed above. The Poisson equations are as follows:

$$\xi_{xx}+\xi_{yy}=P \quad \text{Equation (1)}$$

$$\eta_{xx}+\eta_{yy}=Q. \quad \text{Equation (2)}$$

where $\xi_{xx}$, $\xi_{yy}$, $\eta_{xx}$ and $\eta_{yy}$ are second-order derivates that, as described in detail below, are used to define grid locations.

These Poisson equations also include one or more source terms, e.g., source terms P and Q. A source term defines a grid position of a grid point of a computation mesh. A grid position is the disposition of a grid point within a space. As mentioned above, a space can be a physical space and a computation space, among others. In one example, source terms P and Q define a position within a computation space. In another example, to define a position, source terms P and Q are expressed in terms of a set of computation coordinates ($\xi,\eta$), e.g., P($\xi,\eta$) and Q($\xi,\eta$).

Equations (1) and (2) may be rewritten as follows:

$$g_{22}x_{\xi\xi}+g_{11}x_{\eta\eta}-2g_{12}x_{\xi\eta}+J^2(Px_\xi+Qx_\eta)=0 \quad \text{Equation (3)}$$

$$g_{22}y_{\xi\xi}+g_{11}y_{\eta\eta}-2g_{12}y_{\xi\eta}+J^2(Py_\xi+Qy_\eta)=0 \quad \text{Equation (4)}$$

where $g_{11}$, $g_{22}$ and $g_{12}$ are metric terms defined according to the first-order derivates $x_\xi$, $x_\eta$, $y_\xi$ and $y_\eta$.

The metric terms may be represented as:

$$g_{11} = x_\xi^2 + y_\xi^2 \qquad \text{Equation (5)}$$

$$g_{22} = x_\eta^2 + y_\eta^2 \qquad \text{Equation (6)}$$

$$g_{12} = x_\xi x_\eta + y_\xi y_\eta. \qquad \text{Equation (7)}$$

The term J is a Jacobian that includes the first-order derivates discussed immediately above. An example of a Jacobian includes, but is not limited to:

$$J = x_\xi y_\eta - x_\eta y_\xi. \qquad \text{Equation (8)}$$

Referring back to Equations 3 and 4, source terms P ($\xi,\eta$) and Q ($\xi,\eta$) can be determined in a variety of ways. In one example way to determine source terms P ($\xi,\eta$) and Q ($\xi,\eta$), source terms P ($\xi,\eta$) and Q ($\xi,\eta$) are:

$$P(\xi,\eta) = p(\xi)e^{-a(\xi)(\eta-\eta_1)} + r(\xi)e^{-b(\xi)(\eta_M-\eta)} \qquad \text{Equation (9)}$$

$$Q(\xi,\eta) = q(\xi)e^{-c(\xi)(\eta-\eta_1)} + s(\xi)e^{-d(\xi)(\eta_M-\eta)} \qquad \text{Equation (10)}$$

where a($\xi$), b($\xi$), c($\xi$), d($\xi$) are source decay parameters defined at a value of computation coordinate $\xi$; $\eta$ is a number having a value of computation coordinate $\eta$; $\eta_1$ is a number having a value of $\eta$ proximate the inner boundary along the $\xi$-grid lines; and $\eta_M$ is a number having a value proximate the inner boundary along the $\xi$-grid line (M).

In one example, a source decay parameter is a variable that moderates the one or more mesh equations so as to cause the grid points to be evenly spaced. Examples of a source decay parameter include, but are not limited to, a variable, a number, an integer, a function, a mathematical algorithm and any combinations thereof. In one example, a source decay parameter is an integer selected at random. In another example, a source decay parameter is an integer determined for each value of computational coordinate $\xi$. In still another example, a source decay parameter is an integer equal to one.

In another example way to determine source terms P ($\xi,\eta$) and Q ($\xi,\eta$), source terms P ($\xi,\eta$) and Q ($\xi,\eta$) are:

$$P(\xi,\eta) = p(\xi)e^{-\sigma(\eta-\eta_1)/M} + r(\xi)e^{-\sigma(\eta_M-\eta)/M} \qquad \text{Equation (11)}$$

$$Q(\xi,\eta) = q(\xi)e^{-\sigma(\eta-\eta_1)/M} + s(\xi)e^{-\sigma(\eta_M-\eta)/M} \qquad \text{Equation (12)}$$

where $\sigma$ is a source decay parameter. In one example, source decay parameter $\sigma$ has a value from about 8 to about 16. In another example, source decay parameter $\sigma$ has a value from 8 to 16. In yet another example, source decay parameter $\sigma$ has a value equal to about 14. In still yet another example, source decay parameter $\sigma$ has a value equal to 14. In one exemplary aspect, a decay of a source term defined as $e^{-\sigma(\eta-\eta_1)/M}$ allows for a source term to remain constant for each grid point calculation (e.g., for each set of computational coordinates ($\xi,\eta$)).

In yet another example way to determine source terms P ($\xi,\eta$) and Q ($\xi,\eta$), source terms P ($\xi,\eta$) and Q ($\xi,\eta$) are:

$$P(\xi,\eta) = p(\xi)e^{-k(\eta-\eta_1)} + r(\xi)e^{-k(\eta_M-\eta)} \qquad \text{Equation (13)}$$

$$Q(\xi,\eta) = q(\xi)e^{-k(\eta-\eta_1)} + s(\xi)e^{-k(\eta_M-\eta)} \qquad \text{Equation (14)}$$

where k is a source decay factor that is equal to $\sigma/M$, and $\sigma$ is a source decay parameter as discussed above. In one example, source decay parameter $\sigma$ has a value from about 8 to about 16. In another example, source decay parameter $\sigma$ has a value from 8 to 16. In yet another example, source decay parameter $\sigma$ has a value equal to about 14. In still yet another example, source decay parameter $\sigma$ has a value equal to 14.

As shown in Equations 9 to 14 above, the equations that describe source terms P ($\xi,\eta$) and Q ($\xi,\eta$) also include sources p($\xi$), q($\xi$), r($\xi$) and s($\xi$). Examples of a source include, but are not limited to, a variable, a function, an algorithm and any combinations thereof. In one example, sources p($\xi$) and q($\xi$) are terms determined relative to an inner boundary as:

$$J^2 p(\xi) = \left(\frac{J}{J_1}\right)^\lambda \left[R_1 \frac{y_\eta}{J_1} - R_2 \frac{x_\eta}{J_1}\right]_{\eta_1} \qquad \text{Equation (15)}$$

$$J^2 q(\xi) = \left(\frac{J}{J_1}\right)^\lambda \left[-R_1 \frac{y_\xi}{J_1} + R_2 \frac{x_\xi}{J_1}\right]_{\eta_1} \qquad \text{Equation (16)}$$

and sources r($\xi$) and s($\xi$) are variables determined relative to an outer boundary as:

$$J^2 r(\xi) = \left(\frac{J}{J_M}\right)^\lambda \left[R_3 \frac{y_\eta}{J_M} - R_4 \frac{x_\eta}{J_M}\right]_{\eta_M} \qquad \text{Equation (17)}$$

$$J^2 s(\xi) = \left(\frac{J}{J_M}\right)^\lambda \left[-R_3 \frac{y_\xi}{J_M} + R_4 \frac{x_\xi}{J_M}\right]_{\eta_M} \qquad \text{Equation (18)}$$

where J identifies a Jacobian defining a cell area of a grid cell located within the interior of a grid of a computation mesh; $J_1$ identifies a Jacobian evaluated at an inner boundary; $J_M$ identifies a Jacobian evaluated at an outer boundary; $\lambda$ identifies a Jacobian scaling parameter having a value that is not equal to two; and $R_1$, $R_2$, $R_3$ and $R_4$ are curvature terms (e.g., a term that influences the shape and position of $\xi$-grid lines and $\eta$-grid lines). In particular, each of the $\xi$-grid lines and $\eta$-grid lines include a curvature determined, in part, on the location of each the grid points along the $\xi$-grid or $\eta$-grids. In one example, the curvature is defined as:

$$R_1 = -[g_{22} x_{\xi\xi} - 2g_{12} x_{\xi\eta} + g_{11} x_{\eta\eta}]_{\eta_1} \qquad \text{Equation (19)}$$

$$R_2 = -[g_{22} y_{\xi\xi} - 2g_{12} y_{\xi\eta} + g_{11} y_{\eta\eta}]_{\eta_1} \qquad \text{Equation (20)}$$

$$R_3 = -[g_{22} x_{\xi\xi} - 2g_{12} x_{\xi\eta} + g_{11} x_{\eta\eta}]_{\eta_M} \qquad \text{Equation (21)}$$

$$R_4 = -[g_{22} y_{\xi\xi} - 2g_{12} y_{\xi\eta} + g_{11} y_{\eta\eta}]_{\eta_M} \qquad \text{Equation (22)}$$

A Jacobian scaling parameter, $\lambda$, may include any value that is not equal to two. Examples of a value for $\lambda$ that does not equal two include, but are not limited to, a variable, a formula, an algebraic expression, an integer, a fraction, other number, or any combination thereof. In one example, $\lambda$ is a variable that may be assigned a value. In another example, $\lambda$ is a fixed value for operation with one or more mesh equations. In yet another example, $\lambda$ has a value from about 0.5 to about less than 2. In still another example, $\lambda$ has a value from 0.5 to 2. In still yet another example, $\lambda$ has a value of about 1.25. In a further example, $\lambda$ has a value of 1.25.

In one implementation, one or more first-point distance parameters, e.g., the inner boundary distance parameter $D_1$ and the outer boundary distance parameter $D_M$, relate to one or more mesh equations via sources p, q, r and s and the dependence of sources p, q, r and s as described above on the second-order derivatives $\eta_{xx}$ and $\eta_{yy}$ and with the first-order derivates $x_\eta$ and $y_\eta$. A grid location defined by first-order derivates $x_\eta$ and $y_\eta$ can be expressed in terms of the first-order derivates $x_\xi$ and $y_\xi$ along an inner boundary. While it is contemplated that several variations of expressions of $x_\eta$ and $y_\eta$ may exist, examples of a first order derivate along an inner boundary are illustrated as:

$$[x_\eta]_{\eta_1} = \left[D_1(\xi)\frac{-x_\xi\cos\theta - y_\xi\sin\theta}{\sqrt{g_{11}}}\right]_{\eta_1} \quad \text{Equation (23)}$$

$$[y_\eta]_{\eta_1} = \left[D_1(\xi)\frac{-y_\xi\cos\theta - y_\xi\sin\theta}{\sqrt{g_{11}}}\right]_{\eta_1} \quad \text{Equation (24)}$$

First-order derivates $x_\eta$ and $y_\eta$ can also be expressed in terms of the first-order derivate $x_\xi$ and $y_\xi$ along an outer boundary. While it is contemplated that several variations of expressions of $x_\eta$ and $y_\eta$ may exist, examples of a first-order derivates along an outer boundary are illustrated as:

$$[x_\eta]_{\eta_M} = \left[D_M(\xi)\frac{-x_\xi\cos\theta - y_\xi\sin\theta}{\sqrt{g_{11}}}\right]_{\eta_M} \quad \text{Equation (25)}$$

$$[y_\eta]_{\eta_M} = \left[D_M(\xi)\frac{-y_\xi\cos\theta - y_\xi\sin\theta}{\sqrt{g_{11}}}\right]_{\eta_M} \quad \text{Equation (26)}$$

where $\theta$ is an angle between a $\xi$-grid line and a boundary, e.g., an inner boundary and an outer boundary. $D_1(\xi)$ is an inner boundary distance parameter defined at a value of computation coordinate $\xi$. Each of $D_1$ and $D_M$ may be determined by any known method of determining a first-point distance parameter.

At a high level, a first-point distance parameter describes a spatial location for a grid point of a computation mesh. A grid location is a spatial position within a computation domain of interest in a space proximate a shape to be analyzed. Examples of a grid location include, but are not limited to, a set of coordinates, a distance, a fraction of the overall length scale of the computation domain of interest and any combinations thereof. In one example, a first-point distance parameter determines a grid location in relation to one or more boundaries. A boundary may include an extremity of a grid of a computation mesh. Examples of a boundary include, but are not limited to, an inner boundary, an outer boundary, a specified interior portion of a computation domain of interest, and any combinations thereof. An inner boundary may include an inside portion of a grid of a computation mesh. In one example, an inner boundary is the outside edge of a shape being analyzed. In one such example, information corresponding to a shape may be provided as a plurality of data points that may be used to define an inner boundary. An outer boundary may include an outside portion of a grid of a computation mesh. In one example, an outer boundary is the outside edge of a computation mesh being generated. In one such example, an outer boundary may include a number of data points (e.g., grid points) that may be used to define the outer boundary. A first-point distance parameter that influences a grid location in relation to an inner boundary may be referred to as an inner boundary distance parameter. A first-point distance parameter that influences a grid location in relation to an outer boundary may be referred to as an outer boundary distance parameter.

In one example, an automated first-point distance parameter is a first-point distance parameter that allows for automation with respect to a first-point distance determination in a generation of a computation mesh as described herein.

In one embodiment of a Jacobian scaling parameter system and method, an outer boundary distance parameter $D_M$ varies as a function of an inner boundary distance parameter $D_1$:

$$D_M = F*D_1 \quad \text{Equation (27)}$$

where F is a function of the number of grid points along the $\xi$-grid lines (where the number of grid points along the $\xi$-grid lines may be referred to as M):

$$D_M = F(M)*D_1. \quad \text{Equation (28)}$$

In one example, F(M) is defined as:

$$F(M) = \ln(M), \quad \text{Equation (29)}$$

where $\ln(M)$ is the natural log of M. Use of a relationship between $D_M$ and $D_1$ that involves F(M) including the natural log of M may be referred to as log scaling.

In another example, F(M) is defined as an approximation of $\ln(M)$ which, as M increases, F(M) increases at a pace slightly faster than $\ln(M)$. In one such example, an approximation of $\ln(M)$ is satisfied by $M^v$, where v is an exponent of M having a value of about 0.2 to about 0.8 (eg, $M^{0.2}$, $M^{0.3}$, $M^{0.4}$, $M^{0.5}$, $M^{0.6}$, $M^{0.7}$, $M^{0.8}$). In another such example, an approximation of $\ln(M)$ is satisfied by $M^v$, where v is an exponential of M having a value of about 0.3 to about 0.7 (e.g., $M^{0.3}$, $M^{0.4}$, $M^{0.5}$, $M^{0.6}$, $M^{0.7}$). In yet another such example, an approximation of $\ln(M)$ is satisfied by $M^v$, where v is an exponential of M having a value of about 0.4 to about 0.6 (e.g., $M^{0.4}$, $M^{0.5}$, $M^{0.6}$). In still yet another such example, an approximation of $\ln(M)$ is satisfied by $M^v$, where v is an exponential of M having a value of about 0.5 (e.g., $M^{0.45}$, $M^{0.5}$, $M^{0.55}$).

In yet another example, F(M) is defined as:

$$F(M) = \sqrt{M}, \quad \text{Equation (30)}$$

where $\sqrt{M}$ is the square root of M. Use of a relationship between $D_M$ and $D_1$ that involves F(M) including the square root of M may be referred to herein as square root scaling.

The number of grid points along the $\xi$-grid lines (M) can be determined in a variety of ways. In one example, the shape to be analyzed establishes the value of M. In another example, a desired number of grid cells establishes the value of M. In still another example, the value of M is determined according to an end user preference. A $\xi$-grid line mesh parameter may include a value that is the number of grid points along the $\xi$-grid lines. In one example, a $\xi$-grid line mesh parameter is provided to one or more mesh equations (e.g., mesh equations 3 and 4 below).

Inner boundary distance parameter $D_1$ can be defined in a number of ways. In one example, inner boundary distance parameter $D_1$ is a local inner boundary distance parameter $D_1(\xi)_{LOC}$. A local inner boundary distance parameter $D_1(\xi)_{LOC}$ is determined by dividing the length of a $\xi$-grid line by the number of points along that $\xi$-grid line (M). The length of a $\xi$-grid line can be determined in a variety of ways. In one example, the length is a straight-line distance between the inner boundary of the computation mesh and the outer boundary of the computation mesh. In another example, the length of the $\xi$-grid line is an actual length of the $\xi$-grid line (e.g., a non-straight $\xi$-grid line) between the inner boundary of the computation mesh and the outer boundary of the computation mesh. In still another example, the length of the $\xi$-grid line is the distance between the point formed by the intersection of the $\xi$-grid line and an inner boundary of the computation mesh to the point formed by the intersection of the $\xi$-grid line and an outer boundary of the computation mesh. In yet another example, the length of the $\xi$-grid line is the distance between the point formed by the intersection of the $\xi$-grid line and an inner boundary of the computation mesh to the point formed by the intersection of the ξ-grid line and an outer boundary of the computation mesh running along the ξ-grid line itself.

In another example, inner boundary distance parameter $D_1$ is a global inner boundary distance parameter $D_1(\xi)_{GBL}$. A global inner boundary distance parameter $D_1(\xi)_{GBL}$ is determined by summing the local inner boundary distance parameter $D_1(\xi)_{LOC}$ for each value of computation coordinate ξ and dividing by the number of grid points along the η-grid lines (where the number of grid points along the η-grid lines may be referred to as N).

In another implementation, determination of when to use a global inner boundary distance parameter or a local inner boundary distance parameter for $D_1$ can be made based on whether the number of grid points along the ξ-grid lines (M) [e.g., the number of η-grid lines] exceeds a threshold resolution parameter. A threshold resolution parameter is a parameter used to distinguish between a desired computation mesh having a high concentration of grid cells positioned between the inner boundary and the outer boundary (e.g., a fine mesh) and a desired computation mesh having a low concentration of grid cells positioned between the inner boundary and the outer boundary (e.g., a course mesh). A threshold resolution parameter value may be determined in a variety of ways. In one example, such a threshold resolution parameter may be dictated by a desired outcome and/or performance characteristics for a given shape with relation to a particular set of one or more mesh equations. In one such example, a threshold resolution parameter value is about 20. In another example, a threshold resolution parameter value is 20. In yet another example, a threshold resolution parameter value is about 40. In still another example, a threshold resolution parameter value is 40. In still yet another example, a threshold resolution parameter value is about 50. In a further example, a threshold resolution parameter value is 50. In still a further example, a threshold resolution parameter value is determined by a desired length of individual grid cells along a ξ-grid line in relation to the total length of a ξ-grid line (e.g., a percentage, such as less than about 1%).

A threshold resolution parameter may be applied in a variety of ways. In one example, a threshold resolution parameter may be fixed for all computation mesh generations. In another example, a threshold resolution parameter may be variable. In such a variable threshold resolution parameter, a user may enter one or more values that influence the value of the variable threshold resolution parameter.

In one implementation, if M exceeds a threshold resolution parameter, an inner boundary distance parameter $D_1$ is a local inner boundary distance parameter; and if M does not exceed the threshold resolution parameter, the inner boundary distance parameter $D_1$ is a global inner boundary distance parameter.

In another implementation, if M exceeds a threshold resolution parameter, an outer boundary distance parameter $D_M$ may be a function of an inner boundary distance parameter and the natural log of M. In one example, $D_1$ is a global inner boundary distance parameter. In another example, $D_1$ is a local inner boundary distance parameter.

In yet another implementation, if M does not exceed a threshold resolution parameter, an outer boundary distance parameter $D_M$ may be a function of an inner boundary distance parameter and the square root of M. In one example, $D_1$ is a global inner boundary distance parameter. In another example, $D_1$ is a local inner boundary distance parameter.

In still yet another implementation, if M does not exceed a threshold resolution parameter, an outer boundary distance parameter $D_M$ may be a function of an inner boundary distance parameter and an approximation of the natural log of M (e.g., $M^v$) In one example, $D_1$ is a global inner boundary distance parameter. In another example, $D_1$ is a local inner boundary distance parameter.

Exceeding a threshold parameter (or other value) may be determined in a variety of ways and may depend on the individual value of the threshold parameter. In one example, exceeding a threshold parameter includes any value that is greater than the threshold parameter value. In another example, exceeding a threshold parameter includes any value that is greater than or equal to the threshold parameter value.

The layout of a particular computation mesh may be dictated by one or more mesh parameters. A mesh parameter is a variable or other value that defines one or more facets of the computation mesh. Examples of a mesh parameter include, but are not limited to, a variable, a number, a mathematical function and any combinations thereof. In one example, a mesh parameter is the total number of grid points. In another example, a mesh parameter is the number of grid points on a ξ-grid lines (M). In still another example, a mesh parameter is the number of grid points on a η-grid line (N). It should be noted that where a value of M and/or N is provided, it is contemplated that the provided value for each of M and/or N may be the number of grid points along the corresponding line plus or minus an integer (e.g., 1, 2, etc) and the concepts of provided values of M and/or N as used herein (and the corresponding mathematical manipulation required to determine the appropriate number of points) includes such a variation.

In still yet another example, a mesh parameter depends on the value of the number of grid cells along a ξ-grid lines (e.g., a value of the number of grid cells plus one). In a further example, a mesh parameter depends on the value of the number of grid cells along a η-grid line (e.g., a value of the number of grid cells plus one).

Referring back to FIG. 1, an embodiment 100 of a portion of a computation mesh 100 generated utilizing a method for generating a computation mesh as described herein is illustrated. In this example, the number of grid points along the ξ-grid lines (M) is 6 and the number of grid points along the η-grid lines (N) is 11. The values of M and N may vary depending on the implementation. In another example, the number of grid points along the ξ-grid lines (M) can vary from 5 to 300 and the number of grid points along the η-grid lines (N) is can vary from 10 to 150. FIG. 1 also includes a shape 160. A shape (e.g., shape 160) can be any shape, form, profile or other feature for analysis using the analytical tools mentioned above. Examples of such a shape include, but are not limited to, a symmetric airfoil, an asymmetric airfoil, an Oval of Cassini, a turbine blade, a cascade, and any combinations thereof. Moreover, although discussed in connection with two-dimensional mesh generation, it is contemplated that the generation techniques disclosed herein (e.g., in conjunction with shape 160) include shapes having more than two dimensions. Examples of some applicable multi-dimensional shapes include, but are not limited to, an airfoil, a wing, a turbine blade, and any combinations thereof.

Computation mesh 100 also includes an inner boundary 165 and an outer boundary 170. In one example, inner boundary 165 corresponds with an outer edge 175 of shape 160. As illustrated in FIG. 1, outer boundary 170 is spaced in relation to inner boundary 165. In one example, outer boundary 170 is the outer edge of computation mesh 180 with a contour that corresponds with the contour of inner boundary 165. It is further contemplated that an inner boundary (e.g., inner boundary 165) and an outer boundary (e.g., outer boundary 170) may each encompass any shape, form, and/or curvature.

Such shape, form, and/or curvature may be influenced, for example, by the object shape being analyzed, one or more analytical tool characteristics, a characteristic of the space proximate the object shape being analyzed, other consideration, and any combinations thereof.

Computation mesh 100 further includes a plurality of grid lines 185, such as η-grid lines 185a and ξ-grid lines 185b. As displayed in the present example, grid lines (e.g., ξ-grid line 185a and η-grid line 185b) connect one or more of the plurality of grid points 125 in computation mesh 100. Grid lines 185 intersect such that computation mesh 100 includes a plurality of grid cells 190 that define a grid cell area 190a. A plurality of angles 195 (where angle 195 may be referred to as θ) are formed by the intersection of each of ξ-grid lines 185a with inner boundary 165 and outer boundary 170.

In one example, a grid cell provides a model for analyzing a portion of the computation mesh. The grid cells may be used to approximate a property associated with one or more analytical methods. Examples of such methods include, but are not limited to, computational fluid dynamics, finite element analysis, heat transfer modeling, stress/strain computations and any combinations thereof. Despite the complicated mathematical features of a chosen analytical method, such as, computational fluid dynamics, the approximate properties for each of the grid cells can be aggregated to obtain a complete analytical model.

In one example, each value of a computation coordinate ξ and value of a computation coordinate η in a computation space (e.g., computation space 105) may be utilized to determine a $P(\xi,\eta)$ and $Q(\xi,\eta)$ for each grid point.

Figure 2:
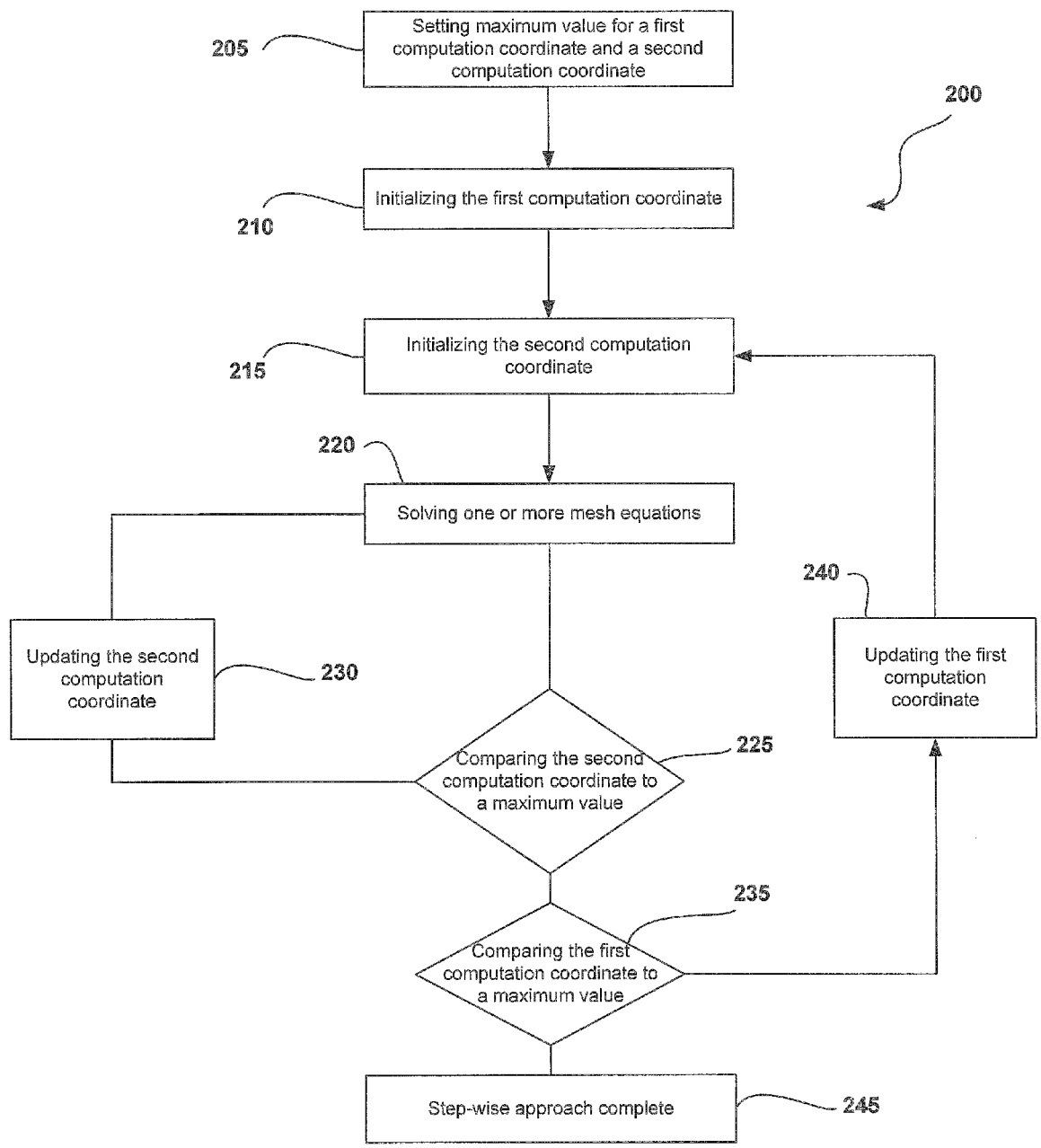
FIG. 2 illustrates an example of a step-wise approach for solving one or more mesh equations.

FIG. 2 illustrates one example of a step-wise approach 200 for solving one or more mesh equations, such as one or more mesh equations including a Jacobian Scaling Parameter that is not equal to 2. At step 205, a maximum value for each of computation coordinate ξ (where the maximum value may be referred to as $\xi_{MAX}$) and computation coordinate η (where the maximum value may be referred to as $\eta_{MAX}$) is set. In one example, the value of $\xi_{MAX}$ and $\eta_{MAX}$ is the number of grid points along the η-grid lines (N) and the number of grid points along the ξ-grid lines (M), respectively. At step 210 and 215, an initial value of coordinate ξ and η are set. In one example, the initial value of both coordinates ξ and η is 0. In another example, any value may be used as the initial value. In yet another example, an initial value may be based on the number of grid points, the value of M and N, the type of grid to be generated, among others.

At step 220, one or more mesh equations (e.g., Equations 3 and 4) for each of the values for coordinates ξ and η are solved. At step 225, a value of coordinate ξ is compared to the value of $\xi_{MAX}$. If the value of coordinate ξ is less than the value of $\xi_{MAX}$, then at step 230, approach 200 includes updating the value of coordinate ξ by an incremental adjustment. An incremental adjustment changes the most recent value of the coordinate ξ by a known amount. In one example, an incremental adjustment is 1. Utilizing this exemplary incremental adjustment, an updated value of coordinate ξ is ξ+1.

When the value of coordinate ξ is equal to the value of $\xi_{MAX}$, then at step 235, approach 200 includes comparing the value of coordinate η to $\eta_{MAX}$. If the value of coordinate η is less than the value of $\eta_{MAX}$, then at step 240 approach 200 includes updating the value of coordinate η by an incremental adjustment. An incremental adjustment changes the most recent value of the coordinate η by a known amount. In one example, an incremental adjustment is 1. Utilizing this incremental adjustment, an updated value of coordinate η is η+1.

In exemplary approach 200 this iteration continues until coordinate η is equal to the value of $\eta_{MAX}$. At this point in approach 200, the one or more mesh equations have been solved for each value of coordinate ξ and coordinate η. Table 1 illustrates a hypothetical example solution based on the application of a step-wise approach (e.g., step-wise approach 200) to solve one or more mesh equations for a computation mesh (e.g., computation mesh 100 (FIG. 1)). In this example, grid locations for each of grid points 150-165 are determined by hypothetically solving one or more mesh equations for values of source term $P(\xi,\eta)$ and $Q(\xi,\eta)$:

TABLE 1

| Point | ξ | η | $P(\xi,\eta)$ | $Q(\xi,\eta)$ |
|---|---|---|---|---|
| 150 | 0 | 0 | P1 | Q1 |
| 151 | 1 | 0 | P2 | Q2 |
| 152 | 2 | 0 | P3 | Q3 |
| 153 | 3 | 0 | P4 | Q4 |
| 154 | 4 | 0 | P5 | Q5 |
| 155 | 5 | 0 | P6 | Q6 |
| 156 | 6 | 0 | P7 | Q7 |
| 157 | 7 | 0 | P8 | Q8 |
| 158 | 8 | 0 | P9 | Q9 |
| 159 | 9 | 0 | P10 | Q10 |
| 160 | 10 | 0 | P11 | Q11 |
| 161 | 1 | 1 | P12 | Q12 |
| 162 | 2 | 2 | P13 | Q13 |
| 163 | 3 | 3 | P14 | Q14 |
| 164 | 4 | 4 | P15 | Q15 |
| 165 | 5 | 5 | P16 | Q16 |

Figure 3:
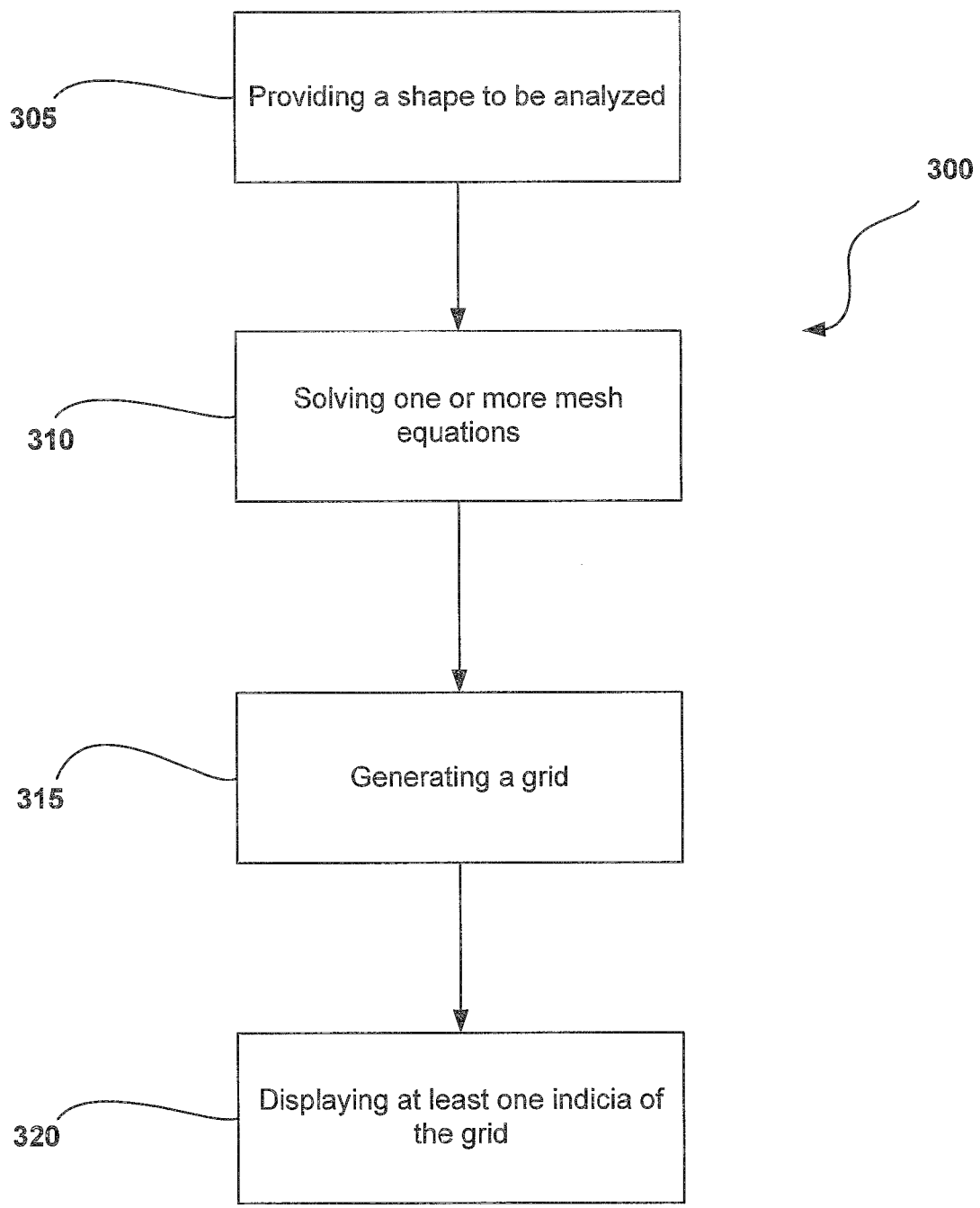
FIG. 3 illustrates one embodiment of a computer-implemented method generating a computation mesh.

FIG. 3 illustrates one exemplary embodiment of a method 300 that employs one or more mesh equations to generate a computation mesh (e.g., computation mesh 100 (FIG. 1)). Method 300, at stage 305, includes providing information corresponding to a shape (e.g., shape 160 (FIG. 1)) for analysis using one or more analytical tools and/or methods (e.g., computational fluid dynamics, finite element analysis, heat transfer analysis, and vibrational analysis). Information corresponding to a shape may be provided in a variety of ways. In one example, information corresponding to a shape is provided by a user. In another example, information corresponding to a shape is provided by an electronic means for creating, designing, and/or rendering such information (e.g., a computer aided design software application used in conjunction with a system and/or method according to the disclosure herein for generating a computational mesh).

Information corresponding to a shape may include a variety of data that may be used in conjunction with a system and/or method of generating a computational mesh according to the current disclosure. Examples of information that may be included in information corresponding to a shape include, but are not limited to, one or more data representations of a plurality of points defining a boundary of a shape, data representing a function defining a boundary of a shape, one or more data representations of a plurality of points defining an outer boundary for a computation mesh for a shape, data representing a function defining an outer boundary for a computation mesh for a shape, a number of grid points along the η-grid lines (N), and any combinations thereof.

Information corresponding to a shape may represent a variety of shapes, including but not limited to, a two-dimensional shape (e.g., a segment of a three-dimensional shape), a three-dimensional shape, and any combinations thereof. In one example, a three-dimensional shape may be divided into a plurality of two-dimensional shape segments (e.g., slices), each of which may be subjected to an analysis requiring a computation mesh. One or more mesh equations as described herein may be utilized to generate each computation mesh.

In addition to the provision of information corresponding to a shape, other information may also be provided. In one embodiment, information corresponding to a mesh parameter and/or a value of a mesh parameter may be provided. Examples of a mesh parameter include, but are not limited to, a number of grid points along the $\xi$-grid lines (M), a number of grid points along the $\eta$-grid lines (N), and any combinations thereof. In one example, a value for M is provided. In another example, a value for N is provided. In yet another example, a value for M and a value for N is provided. It is contemplated that in one embodiment a user may provide only information corresponding to a shape, a value for M, and a value for N (e.g., separate information corresponding to N, information corresponding to N incorporated into the information corresponding to a shape). In an alternate example, the number of grid points along the $\eta$-grid lines (N) are incorporated into one or more portions of the shape, e.g., the defining edge of the shape shown in FIG. 1. In another example, the number of grid points along the $\eta$-grid lines (N) are assigned according to a user preference. In still another example, both the number of grid points along the $\eta$-grid lines (N) and the number of grid points along the $\xi$-grid lines (M) are implemented at a time proximate to providing the shape at stage 305.

In one example, it is also contemplated that the mesh parameters can be defined subsequent to the execution of method 300. In one example, a user can input mesh parameters based on one or more prompts from a computer-implementation of method 300 before providing a shape to be analyzed. It is further contemplated that the mesh parameters can be defined contemporaneous with the execution of method 300. In one example, a user can input mesh parameters based on one or more prompts from a computer-implementation of method 300 before while providing a shape to be analyzed. It is still further contemplated that the mesh parameters can be defined after the execution of method 300. In one example, a user can input different mesh parameters based on one or more prompts from a computer-implementation of method 300.

At stage 310, method 300 includes solving the one or more mesh equations. In one example, one or more mesh equations depend on an outer boundary distance parameter determined by a function of an inner boundary distance parameter. In the present example, solving the one or more mesh equations determines the physical coordinates of grid locations for the plurality of grid points in a computation mesh.

At stage 315, method 300 includes generating a computation mesh as a function of the grid locations. In one example, method 300 uses the physical coordinates of the grid locations to construct a computational mesh based on a position of each of the plurality of grid points proximate the shape to be analyzed. In another example, method 300 uses the physical coordinates of the grid locations to construct a computational mesh based on a position of each of the plurality of grid points with respect to a set of axes. In still another example, method 300 positions each of the plurality of grid points and connects the grid points with one or more $\xi$-grid lines and one or more $\eta$-grid lines.

At stage 320, method 300 includes outputting one or more indicia that represent the computation mesh, or a portion thereof. An indicia is a representative portion of the computation mesh. Examples of an indicia include, but are not limited to, a graph, a plot, a point, a set of axes, an displayable image, and any combination thereof. In one example, an indicia is a full view of the computation mesh, such as those views illustrated in the Experimental Examples below. In another example, an indicia is a portion of the computation mesh having analytical significance to the user. In another example, an indicia is a computation mesh, or portion of a computation mesh, selected by a user for outputting.

The indicia can be output to a variety of different places. In one example, outputting an indicia representing the computational mesh can occur on a computer-related peripheral device. A variety of peripheral output devices are discussed below with respect to an exemplary machine environment for implementation of any one or more of the aspects and/or embodiments disclosed herein. In one example, a computer-related peripheral is a display device (e.g., a computer monitor). In another example, the computer-related peripheral is a PDA. In still another example, outputting an indicia representing a computational mesh can occur via a network connection so as to cause the computation mesh to output in a different computer-related application, e.g., a computational fluid dynamics application. Although not illustrated, it is contemplated that outputting the indicia can occur simultaneously with the generation of the computation mesh discussed in step 315. It is further contemplated that outputting the indicia can occur after the computation mesh is generated in stage 315.

In alternative exemplary implementation of a method of FIG. 3, a method may include a repetitive mathematical operation that determines the physical coordinates of the grid locations utilizing one or more mesh equations according to a repetitive calculation. A repetitive calculation involves successively updating the physical coordinates for each grid location of the grid points in the grid of a computation mesh based on the solution of the one or more mesh equations.

In one example, a terminating criteria (e.g., an error threshold) may be provided for to determine the completion of a repetitive calculation. In one example a terminating criteria is a variable, or other value, which indicates when the proper (e.g., desired) physical coordinates for each grid location are determined. Examples of a terminating criteria include, without limitation, an error value, a maximum number of repetitions, a convergence criteria, and any combinations thereof. In one example, if the terminating criteria is an error value, method 300 continues to calculate the physical coordinates for each grid location until the error value is met. In another example, if the terminating criteria is a maximum number of repetitions, method 300 will continue until the maximum number of iterations is reached.

A variety of repetitive mathematical operations are known in the art. Examples of a repetitive mathematical operation include, but are not limited to, a direct mathematical method, an iterative mathematical method, a domain decomposition method, an approximate factorization method and any combinations thereof. In one embodiment of a Jacobian scaling parameter system and/or method, an iterative mathematical method is used. An iterative mathematical method is a numerical method used to solve the one or more mesh equations (e.g., Equations 3 and 4) by generating successive approximate solutions to a given equation (or set of equations), such as the one or more mesh equations. Examples of an iterative method include, but are not limited to, successive line over-relaxation (SOR) method, Jacobi method, Gauss-Seidel method, and any combinations thereof. Although discussed as one exemplary implementation below, a more technical discussion of an iterative method, such as an SOR method, and the mathematical techniques associated with the application of such method to elliptic grid generation is available in open literature and engineering text, such as, for example, Computation Fluid Mechanics and Heat Transfer, Hemisphere Publishing Company (1994), incorporated herein by reference in its entirety.

In one example, an iterative mathematical method generates a final solution set of physical coordinates from an initial approximation for the solution set of physical coordinates. A solution set includes a plurality of physical coordinates that can satisfy one or more mesh equations. Examples of a solution set include, but are not limited to, a matrix, a list, a series of equations and any combinations thereof. In one example, a solution set is a coordinate matrix that includes physical coordinates for grid locations of the plurality of grid points in a computation mesh.

The size of a coordinate matrix can be defined in a number of ways. In one example, the size is equal to the number of grid points along the grid lines (M). In another example, the size is equal to the number of grid points. In still another example, the size is equal to the number of grid points along the η-grid lines (N). When used in conjunction with an iterative mathematical method, the physical coordinates within a coordinate matrix may be repeated changed. In one example, to maintain continuity throughout a calculation, each of the physical coordinates may have a position within a coordinate matrix.

In one example, these positions may be defined by the size of the coordinate matrix. A position within a one-dimensional matrix, for instance, may be defined by a single variable based on the size of the matrix. In another example, a position within a two-dimensional matrix may be defined by two variables based on the size of the matrix. These variables may be integers, such as [1, 2, 3 . . . ]. Although for purposes of clarifying the discussion of the positions within a coordinate matrix in the following examples may be referred to by variables (i,j), it is contemplated that the choice of any variables for defining a coordinate matrix or other solution set is within the scope and meaning of this disclosure.

Figure 4:
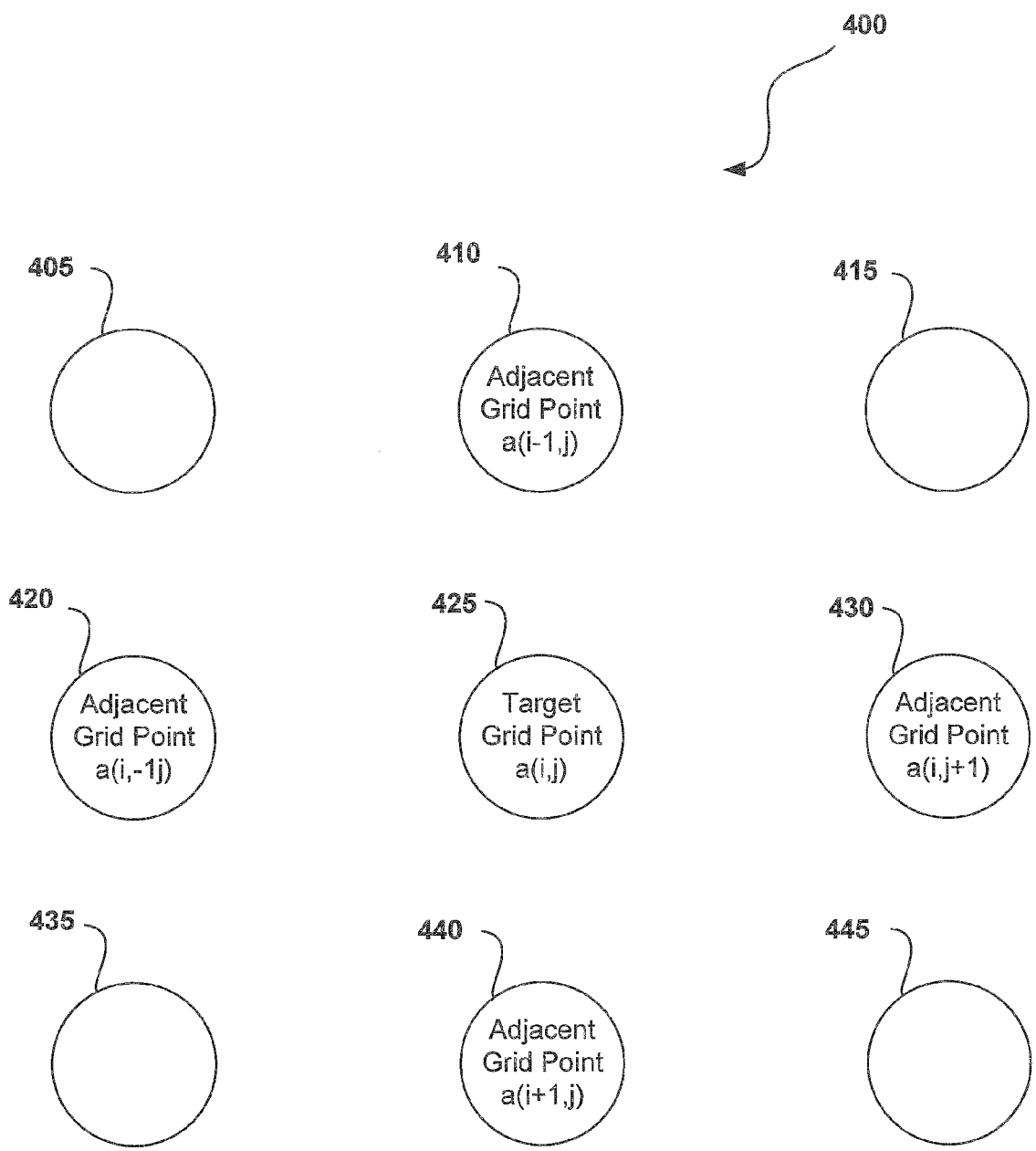
FIG. 4 illustrates one example of grid points generated by a computation mesh generation method.

FIG. 4 illustrates one example 400 of a series of grid points within a computation mesh. In this example, grid points 400 are generated using an iterative method to solve one or more mesh equations (e.g., Equations 3 and 4). Grid points 400 include grid points 405-445. Each of grid points 405-445 includes a grid location 450 having physical coordinates (x,y) 455. In one example, an iterative mathematical method determines physical coordinates (x,y) for a target grid point 425 as a function of the physical coordinates (x,y) of the grid points adjacent the target grid point. A target grid point is a grid point (e.g., grid point 425) for which the physical coordinates (x,y) are determined. Although only a portion of grid points 400 is provided, it is contemplated that the following discussion about the application of an iterative mathematical method to determine the physical coordinates (x,y) of a target grid point can be applied to any number of grid points of a grid of a computation mesh.

The physical coordinates (x,y) for target grid point 425 may be determined as a function of the physical coordinates (x,y) of adjacent grid points. As illustrated in FIG. 4, the adjacent grid points include grid points 410, 420, 430 and 440. Each of these grid points have a corresponding physical coordinate (x,y) in a solution set, e.g., a coordinate matrix having positions (i,j). To determine which physical coordinates (x,y) are adjacent the target grid point, an exemplary iterative method utilizes the position of each physical coordinate (x,y) relative to the position within the coordinate matrix of the physical coordinate (x,y) for target grid point 425. It follows that the position of a physical coordinates (x,y) in the coordinate matrix for each adjacent grid point relative to the position of the physical coordinates (x,y) of the target grid point 425 is: grid point 410 (i−1, j); grid point 420 are (i, j−1); grid point 430 are (i, j+1); and grid point 440 are (i+1, j).

As mentioned above, in this example, an iterative mathematical method may manipulate the initial approximation for the solution set of physical coordinates. In one example, an iterative mathematical method generates successive solution sets of physical coordinates (x,y) by repeatedly solving the same equation (or set of equations). Each of these successive solution sets include physical coordinates (x,y) that vary from the previous solution set. As described in more detail below, variation of physical coordinates from one solution set to another depends on solving the one or more mesh equations (e.g., Equations 3 and 4).

In one example of grid points 400, an iterative mathematical method substitutes one or more of the physical coordinates into the one or more mesh equations (e.g., Equations 3 and 4). By solving the one or more mesh equations, the iterative mathematical method determines if the physical coordinates satisfy the one or more mesh equations. In one example, an iterative mathematical method utilizes the physical coordinates (x,y) so as to solve the left side and the right side in Equations 3 and 4. With reference to the step-wise approach discussed above and illustrated in FIG. 2, an iterative method may utilize the physical coordinates for each of the grid points in a computation mesh by successively increasing the values of one or more variables that define the solution set, e.g., a coordinate matrix.

It should be noted that a variety of methods and variations of aspects of methods for generating a computation mesh according to the above described aspects and embodiments will be clear to one or ordinary skill. FIGS. 19 and 20A to 20C illustrate one exemplary embodiment of an iterative method of solving one or more mesh equations.

It is to be noted that the aspects and embodiments described herein may be conveniently implemented using one or more machines (e.g., a computing device) programmed according to the teachings of the present specification, as will be apparent to those of ordinary skill in the computer art. For example, various aspects of a method for a method of generating a computation mesh as described herein, may be implemented as machine-executable instructions (i.e., software coding), such as program modules executed by one or more machines. Typically a program module may include routines, programs, objects, components, data structures, etc. that perform specific tasks. Appropriate machine-executable instructions can readily be prepared by skilled programmers based on the teachings of the present disclosure, as will be apparent to those of ordinary skill in the software art.

Such software may be a computer program product that employs a machine-readable medium. Example computer programs include, but are not limited to, an operating system, a browser application, a micro-browser application, a proxy application, a business application, a server application, an email application, an online service application, an interactive television client application, an ISP client application, a gateway application, a tunneling application, and any combinations thereof. A machine-readable medium may be any medium that is capable of storing and/or encoding a sequence of instructions for execution by a machine (e.g., a computing device) and that causes the machine to perform any one of the methodologies and/or embodiments described herein. Examples of a machine-readable medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory.

Examples of a computing device include, but are not limited to, a general purpose computer; a special purpose computer; a computer workstation; a terminal computer; a notebook/laptop computer; a server computer; a handheld device (e.g., tablet computer, a personal digital assistant "PDA", a mobile telephone, etc.); a web appliance; a network router; a network switch; a network bridge; a set-top box "STB;" video tape recorder "VTR;" a digital video recorder "DVR;" a digital video disc "DVD" device (e.g., a DVD recorder, a DVD reader); any machine, component, tool, equipment capable of executing a sequence of instructions that specify an action to be taken by that machine, and any combinations thereof. In one example, a computing device may include and/or be included in, a kiosk. In another example, a computing device includes a mobile device. In yet another example, a computing device includes a device configured for display of video and/or audio content accessed over a network.

Figure 5:
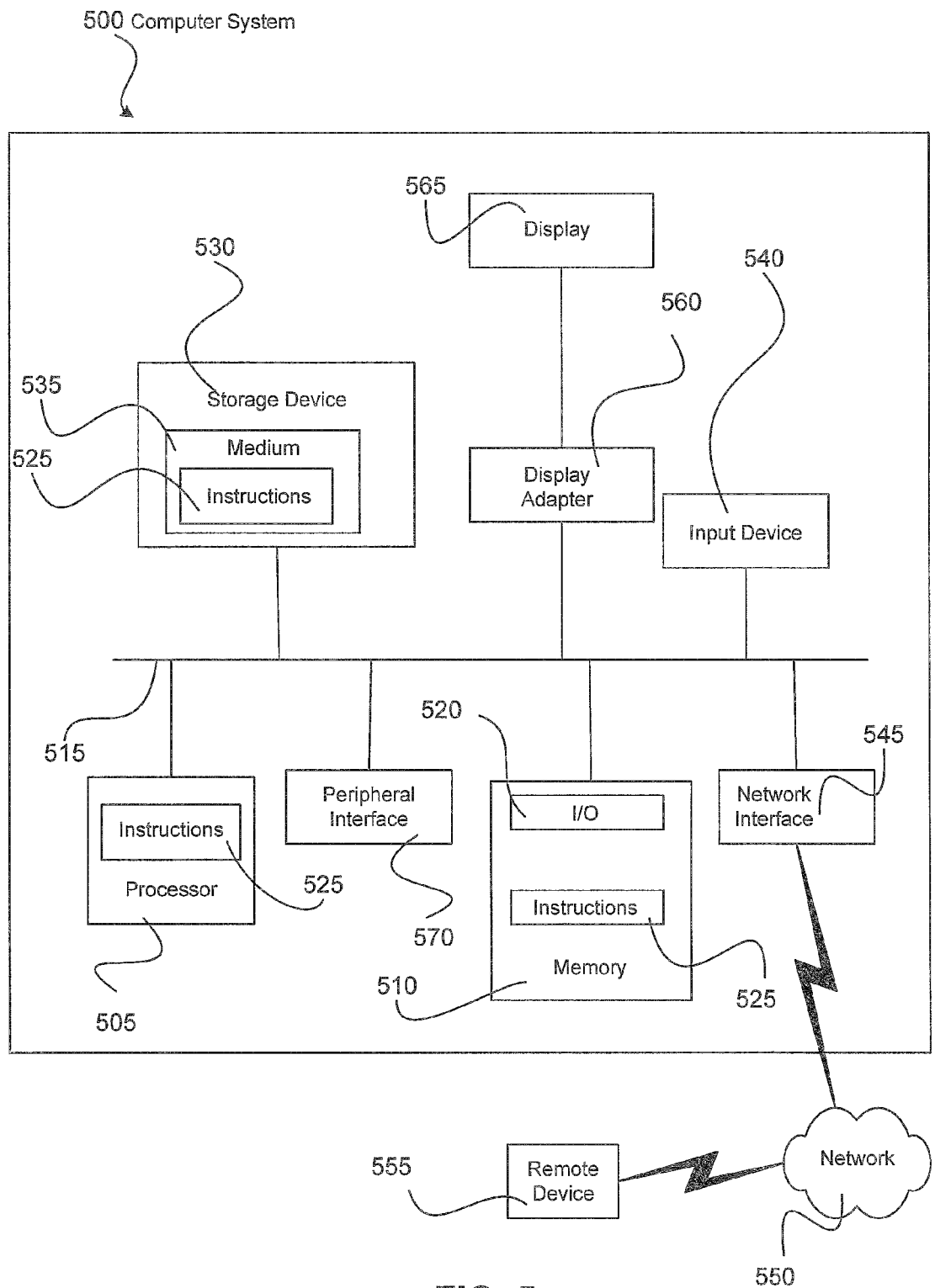
FIG. 5 illustrates one embodiment of a computing environment for implementing a method of generating a computation mesh.

FIG. 5 shows a diagrammatic representation of one embodiment of a machine in the exemplary form of a computer system 500 within which a set of instructions for causing the computing device to perform any one or more of the aspects and/or methodologies of the present disclosure may be executed. It should be noted that although computer system 500 itself and its components may be shown as singular entities, each component and computer system 500 may include any number of components configured to perform a certain functionality. For example, multiple computer systems 500 may combine to perform any one or more of the aspects and/or methodologies of the present disclosure. Additionally any one aspect and/or methodology of the present disclosure may be dispersed across any number of computer system 500 or across any number of computer system components.

Computer system 500 includes a processor 505 and a memory 510 that communicate with each other, and with other components, via a bus 515. Bus 515 may include any of several types of bus structures including, but not limited to, a memory bus, a memory controller, a peripheral bus, a local bus, and any combinations thereof, using any of a variety of bus architectures.

Memory 510 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 520 (BIOS), including basic routines that help to transfer information between elements within computer system 500, such as during start-up, may be stored in memory 510. Memory 510 may also include (e.g., stored on one or more machine-readable media) instructions (e.g., software) 525 embodying any one or more of the aspects and/or methodologies of the present disclosure. In another example, memory 510 may further include any number of program modules including, but not limited to, an operating system, one or more application programs, other program modules, program data, and any combinations thereof.

Computer system 500 may also include a storage device 530. Examples of a storage device (e.g., storage device 530) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 530 may be connected to bus 515 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 530 may be removably interfaced with computer system 500 (e.g., via an external port connector (not shown)). Particularly, storage device 530 and an associated machine-readable medium 535 may provide nonvolatile and/or volatile storage of machine-readable instructions, data structures, program modules, and/or other data for computer system 500. In one example, software 525 may reside, completely or partially, within machine-readable medium 535. In another example, software 525 may reside, completely or partially, within processor 505.

Computer system 500 may also include an input device 540. In one example, a user of computer system 500 may enter commands and/or other information into computer system 500 via input device 540. For example, a user may utilize a computing device with an input device, such as input device 540 to enter information corresponding to a shape and/or one or more mesh parameters. Examples of an input device 540 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 540 may be interfaced to bus 515 via any of a variety of interfaces (not shown) including, but not limited to, a serial interface, a parallel interface, a game port, a USB interface, a FIREWIRE interface, a direct interface to bus 515, and any combinations thereof.

A user may also input commands and/or other information to computer system 500 via storage device 530 (e.g., a removable disk drive, a flash drive, etc.) and/or a network interface device 545. A network interface device, such as network interface device 545 may be utilized for connecting computer system 500 to one or more of a variety of networks, such as network 550, and one or more remote computing devices 555 connected thereto. Examples of a network interface device include, but are not limited to, a network interface card, a modem, and any combination thereof. A network may include one or more elements configured to communicate data (e.g., direct data, deliver data). Examples of a network element include, but are not limited to, a router, a server, a switch, a proxy server, an adapter, an intermediate node, a wired data pathway, a wireless data pathway, and any combinations thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 550, may employ a wired and/or a wireless mode of communication. Various communication protocols (e.g., HTTP, WAP, TCP/IP) and/or encripyption protocols (e.g., UDP) may be utilized in connecting and/or for communication over a network, such as network 550. In general, any network topology may be used. Information (e.g., data, software 525, etc.) may be communicated to and/or from computer system 500 via network interface device 545. In yet another example, storage device 530 may be connected to bus 515 via network interface 545.

In still another example, input device 540 may be connected to bus 515 via network interface 545.

Computer system 500 may further include a video display adapter 560 for communicating a displayable image to a display device, such as display device 565. For example, video display adapter 560 may be utilized to display an interface for accessing one or more content items over a network to display device 565. Examples of a display device include, but are not limited to, a liquid crystal display (LCD), a cathode ray tube (CRT), a plasma display, and any combinations thereof. In addition to a display device, a computer system 500 may include one or more other peripheral output devices including, but not limited to, an audio speaker, a printer, and any combinations thereof. Such peripheral output devices may be connected to bus 515 via a peripheral interface 570. Examples of a peripheral interface include, but are not limited to, a serial port, a USB connection, a FIREWIRE connection, a parallel connection, and any combinations thereof.

A digitizer (not shown) and an accompanying pen/stylus, if needed, may be included in order to digitally capture freehand input. A pen digitizer may be separately configured or coextensive with a display area of display device 565. Accordingly, a digitizer may be integrated with display device 565, or may exist as a separate device overlaying or otherwise appended to display device 565.

EXPERIMENTAL EXAMPLES

Figure 6:
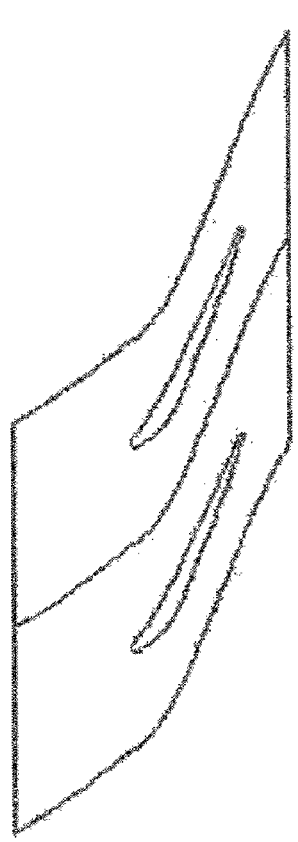
FIG. 6 illustrates an exemplary airfoil with a first boundary.
Figure 7:
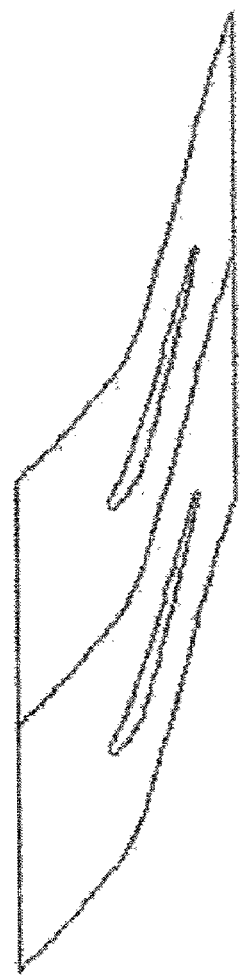
FIG. 7 illustrates an exemplary airfoil with a second boundary.
Figure 8:
FIG. 8 illustrates an exemplary airfoil with a third boundary.

FIGS. 6-8 illustrate examples 600, 700, 800 of a shear transformation of an airfoil. A shear transformation modifies the shape/boundary combination to form a computation mesh having acute angles. Tables two, three, and four illustrate examples of computation meshes generated using one or more mesh equations and Jacobian scaling parameter $\lambda$, as discussed herein. A system and/or method of elliptic grid generation using a Jacobian scaling parameter $\lambda$ works robustly under various conditions, including, but not limited to, shear transformations and varied mesh parameters.

Despite the unpredictability of these transformations, a system and/or method in accordance with the present disclosure accommodates the various permutations of the aforementioned parameters to generate a computation mesh with input of only M and N and/or without continuously modifying variables, e.g., Jacobian scaling parameter $\lambda$. It is further noted that a system and/or method that includes a Jacobian scaling parameter that is not equal to two accommodates the shear transformations tested. Despite the extent of the transformation and the acute angles present along the boundaries, a good computation mesh is generated for each set of mesh parameters, e.g., M and N.

FIG. 6 illustrates an example 600 of a cascade with outer boundary of a computation mesh generated as described herein for an airfoil. Table 2 sets forth eleven examples of computation meshes for the shape/boundary that was subjected to a method of elliptic grid generation having a Jacobian scaling parameter that is not equal to two.

TABLE 2

| | Cascade #1 | | | | | | |
|---|---|---|---|---|---|---|---|
| Trial | Shape | $\lambda$ | $\sigma$ | M | N | # of Iterations | Error Value | Initial Error |
| 1 | Cascade | 1.25 | 14 | 10 | 152 | 67 | 0.000005 | 0.00103 |
| 2 | Cascade | 1.25 | 14 | 20 | 152 | 71 | 0.000005 | 0.00096 |
| 3 | Cascade | 1.25 | 14 | 30 | 152 | 80 | 0.000005 | 0.00092 |

TABLE 2-continued

| | Cascade #1 | | | | | | |
|---|---|---|---|---|---|---|---|
| Trial | Shape | $\lambda$ | $\sigma$ | M | N | # of Iterations | Error Value | Initial Error |
| 4 | Cascade | 1.25 | 14 | 40 | 152 | 79 | 0.000005 | 0.00093 |
| 5 | Cascade | 1.25 | 14 | 50 | 152 | 87 | 0.000005 | 0.00094 |
| 6 | Cascade | 1.25 | 14 | 60 | 152 | 96 | 0.000005 | 0.00099 |
| 7 | Cascade | 1.25 | 14 | 70 | 152 | 106 | 0.000005 | 0.00109 |
| 8 | Cascade | 1.25 | 14 | 80 | 152 | 117 | 0.000005 | 0.00125 |
| 9 | Cascade | 1.25 | 14 | 90 | 152 | 126 | 0.000005 | 0.00149 |
| 10 | Cascade | 1.25 | 14 | 110 | 152 | 146 | 0.000005 | 0.00230 |
| 11 | Cascade | 1.25 | 14 | 136 | 152 | 284 | 0.000005 | 0.00445 |

FIG. 7 illustrates another example 700 of a shear transformation for the mesh of the airfoil of FIG. 6. Table 3 sets forth eleven examples of computation meshes for a shape/boundary (having such a shear transformation) that was subjected to a method of elliptic grid generation having a Jacobian scaling parameter that is not equal to two.

TABLE 3

| | Cascade #2 | | | | | | |
|---|---|---|---|---|---|---|---|
| Trial | Shape | $\lambda$ | $\sigma$ | M | N | # of Iterations | Error Value | Initial Error |
| 12 | Cascade | 1.25 | 14 | 10 | 152 | 73 | 0.000005 | 0.00123 |
| 13 | Cascade | 1.25 | 14 | 20 | 152 | 77 | 0.000005 | 0.00120 |
| 14 | Cascade | 1.25 | 14 | 30 | 152 | 85 | 0.000005 | 0.00117 |
| 15 | Cascade | 1.25 | 14 | 40 | 152 | 85 | 0.000005 | 0.00107 |
| 16 | Cascade | 1.25 | 14 | 50 | 152 | 94 | 0.000005 | 0.00102 |
| 17 | Cascade | 1.25 | 14 | 60 | 152 | 104 | 0.000005 | 0.00098 |
| 18 | Cascade | 1.25 | 14 | 70 | 152 | 115 | 0.000005 | 0.00095 |
| 19 | Cascade | 1.25 | 14 | 80 | 152 | 1127 | 0.000005 | 0.00094 |
| 20 | Cascade | 1.25 | 14 | 90 | 152 | 139 | 0.000005 | 0.00094 |
| 21 | Cascade | 1.25 | 14 | 110 | 152 | 162 | 0.000005 | 0.00105 |
| 22 | Cascade | 1.25 | 14 | 136 | 152 | 188 | 0.000005 | 0.00146 |

FIG. 8 illustrates an example 800 of another example shear transformation for the mesh of the airfoil of FIG. 6. Table 4 sets forth eleven examples of computation meshes for shape/boundary (having such a shear transformation) that was subjected to a method of elliptic grid generation having a Jacobian scaling parameter that is not equal to two.

TABLE 4

| | Cascade #3 | | | | | | |
|---|---|---|---|---|---|---|---|
| Trial | Shape | $\lambda$ | $\sigma$ | M | N | # of Iterations | Error Value | Initial Error |
| 23 | Cascade | 1.25 | 14 | 10 | 152 | 1000* | 0.000005 | 0.00129 |
| 24 | Cascade | 1.25 | 14 | 20 | 152 | 90 | 0.000005 | 0.00125 |
| 25 | Cascade | 1.25 | 14 | 30 | 152 | 102 | 0.000005 | 0.00123 |
| 26 | Cascade | 1.25 | 14 | 40 | 152 | 84 | 0.000005 | 0.00111 |
| 27 | Cascade | 1.25 | 14 | 50 | 152 | 93 | 0.000005 | 0.00105 |
| 28 | Cascade | 1.25 | 14 | 60 | 152 | 104 | 0.000005 | 0.00099 |
| 29 | Cascade | 1.25 | 14 | 70 | 152 | 115 | 0.000005 | 0.00092 |
| 30 | Cascade | 1.25 | 14 | 80 | 152 | 127 | 0.000005 | 0.00087 |
| 31 | Cascade | 1.25 | 14 | 90 | 152 | 139 | 0.000005 | 0.00082 |
| 32 | Cascade | 1.25 | 14 | 110 | 152 | 161 | 0.000005 | 0.00746 |
| 33 | Cascade | 1.25 | 14 | 136 | 152 | 188 | 0.000005 | 0.00072 |

Figure 9:
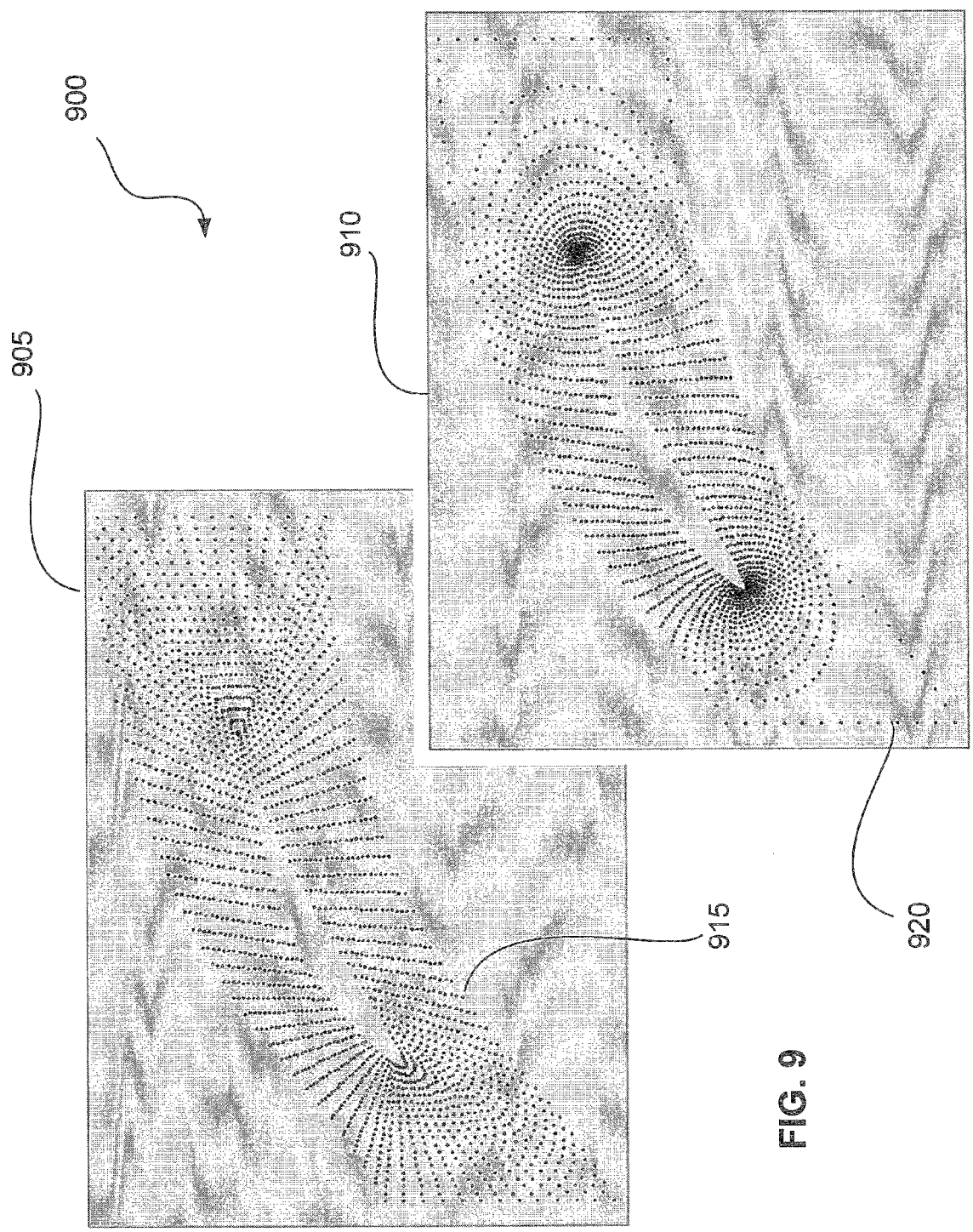
FIG. 9 illustrates an exemplary airfoil with an initial computation mesh and a final computation mesh.
Figure 10:
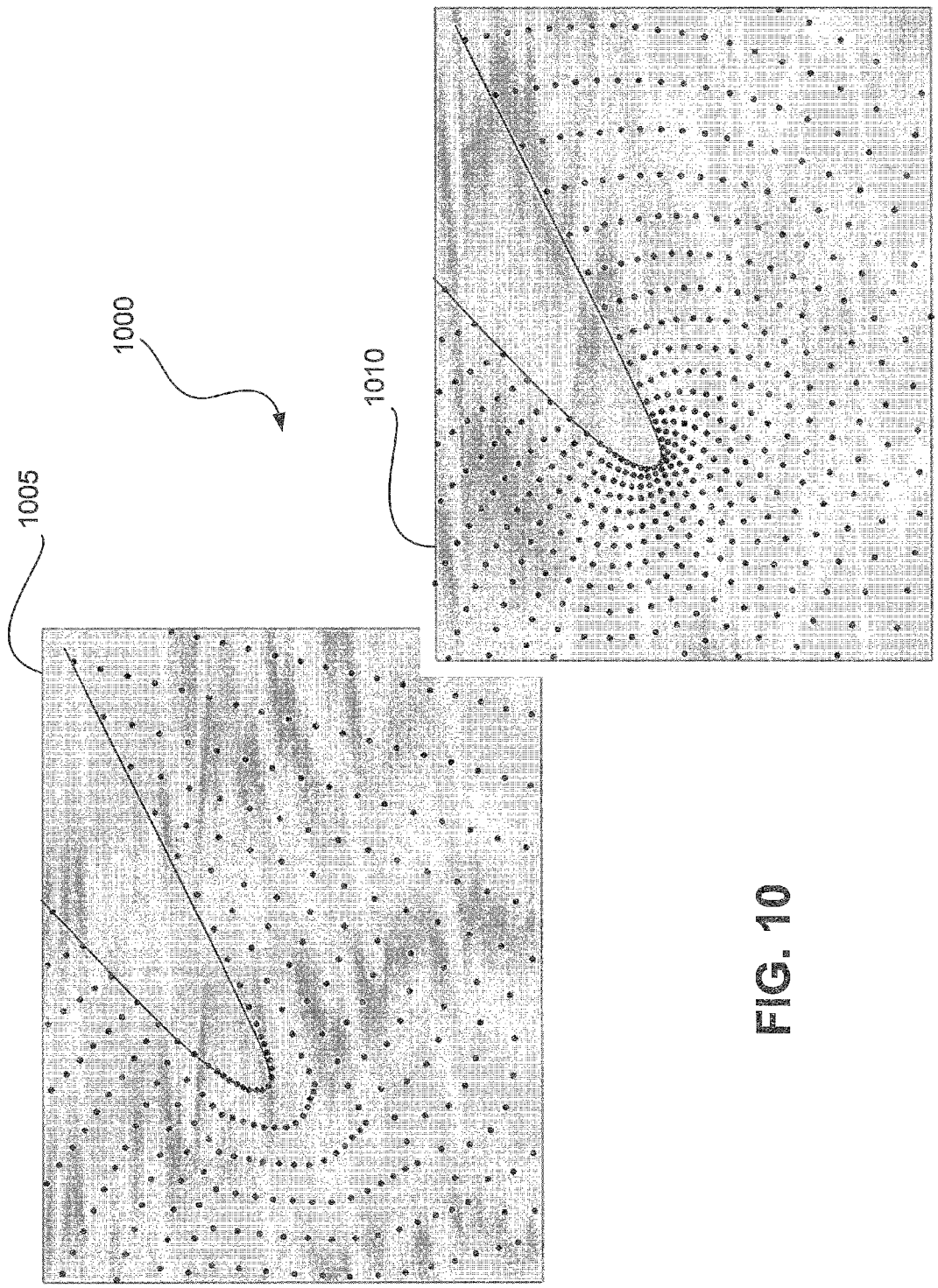
FIG. 10 illustrates the leading edge of the airfoil in FIG. 9.
Figure 11:
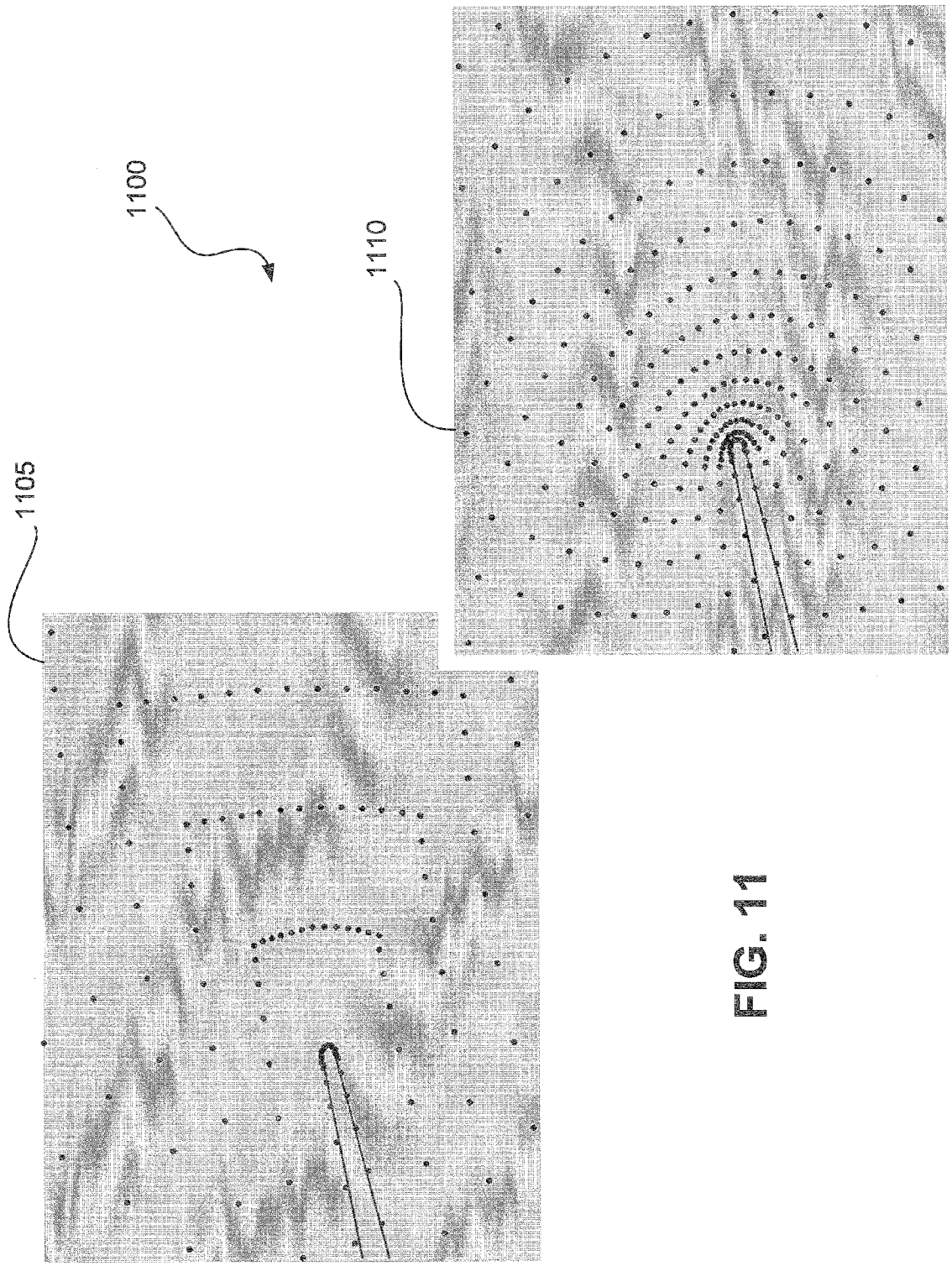
FIG. 11 illustrates the trailing edge of the airfoil in FIG. 9.

FIGS. 9-11 illustrate examples of computation meshes 900, 1000, 1100 determined using a prior art mesh equation for an airfoil. It is noted that while computation mesh 900 illustrates the airfoil in its entirety, computation meshes 1000, 1100 illustrate only the leading edge and the trailing edge, respectively. Computation mesh 900 includes an initial grid 905 and a final grid 910. An initial grid (e.g., grid 905) is a grid that includes a plurality of grid points 915 having a grid location determined before being iterated by one or more mesh equations. A final grid (e.g., grid 910) is a grid that includes a plurality of grid points 920 determined utilizing one or more one or more mesh equations. Computation mesh 1000 includes an initial grid 1005 and a final grid 1010 having grid points that correspond to the leading edge of the airfoil illustrated in FIG. 9. Computation mesh 1100 includes an initial grid 1105 and a final grid 1110 having grid points that correspond to the leading edge of the airfoil illustrated in FIG. 9.

Figure 12:
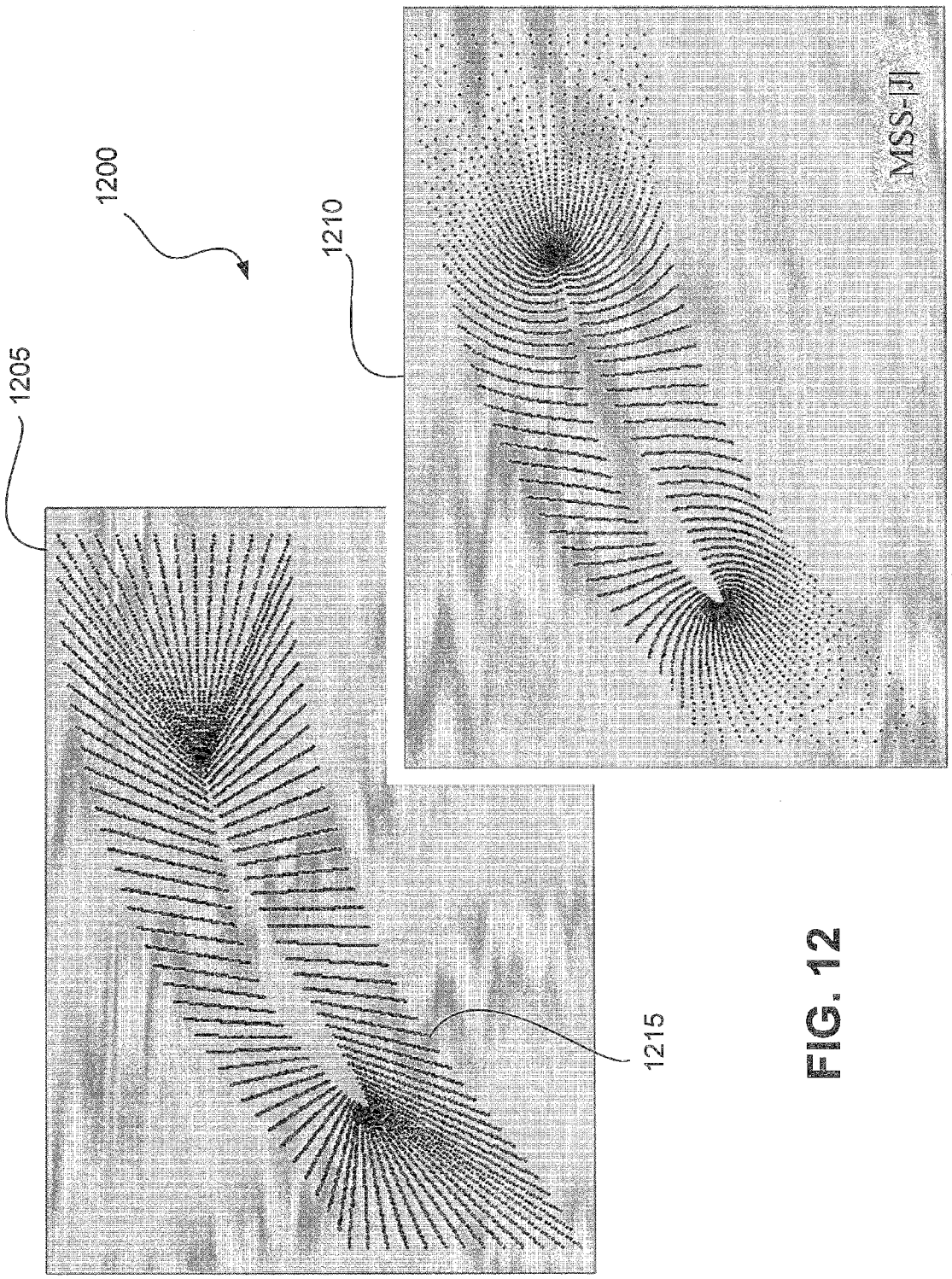
FIG. 12 illustrates an exemplary airfoil with an initial computation mesh and a final computation mesh generated according to one implementation of the present disclosure.
Figure 13:
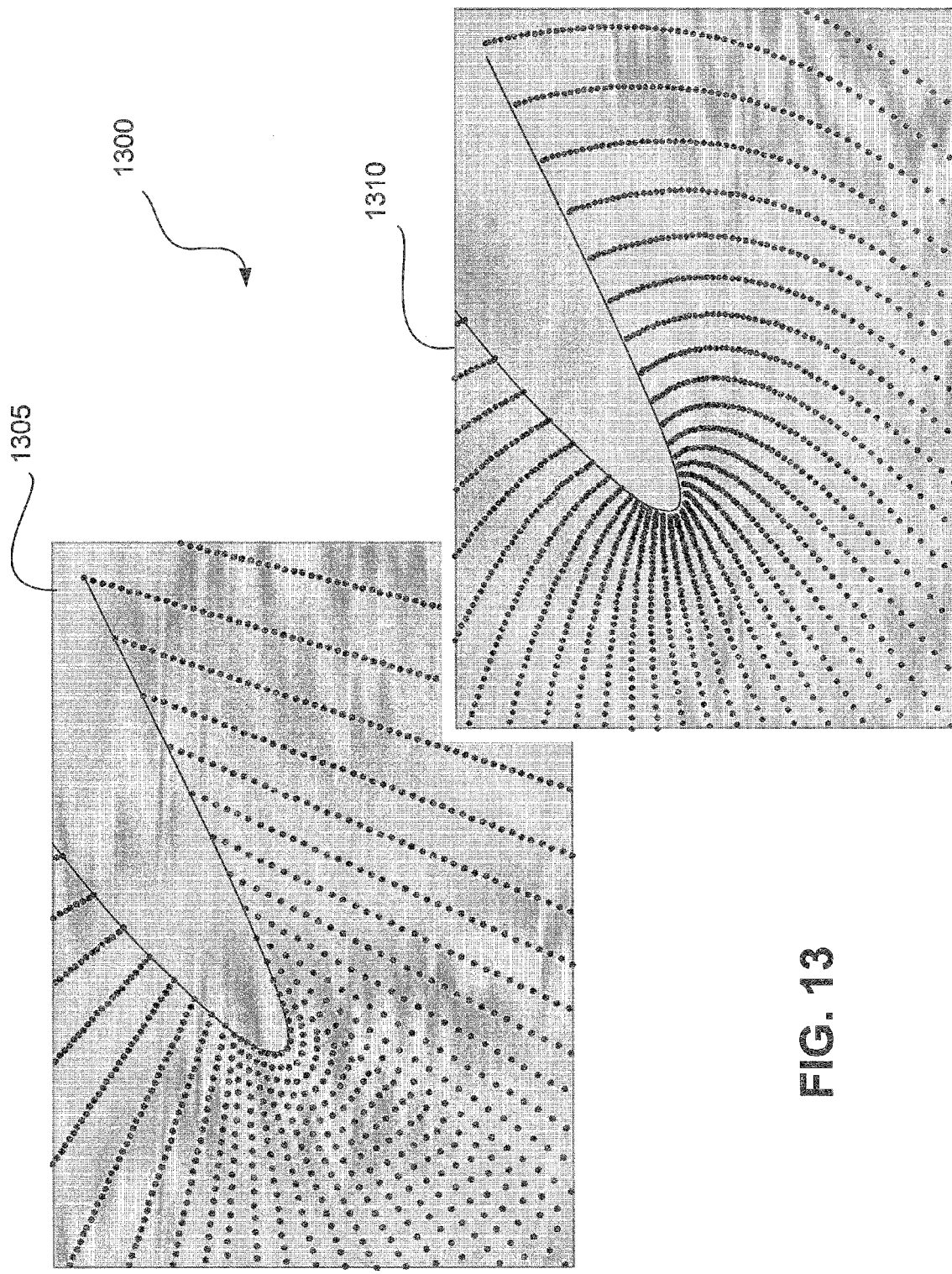
FIG. 13 illustrates the leading edge of the airfoil in FIG. 12.
Figure 14:
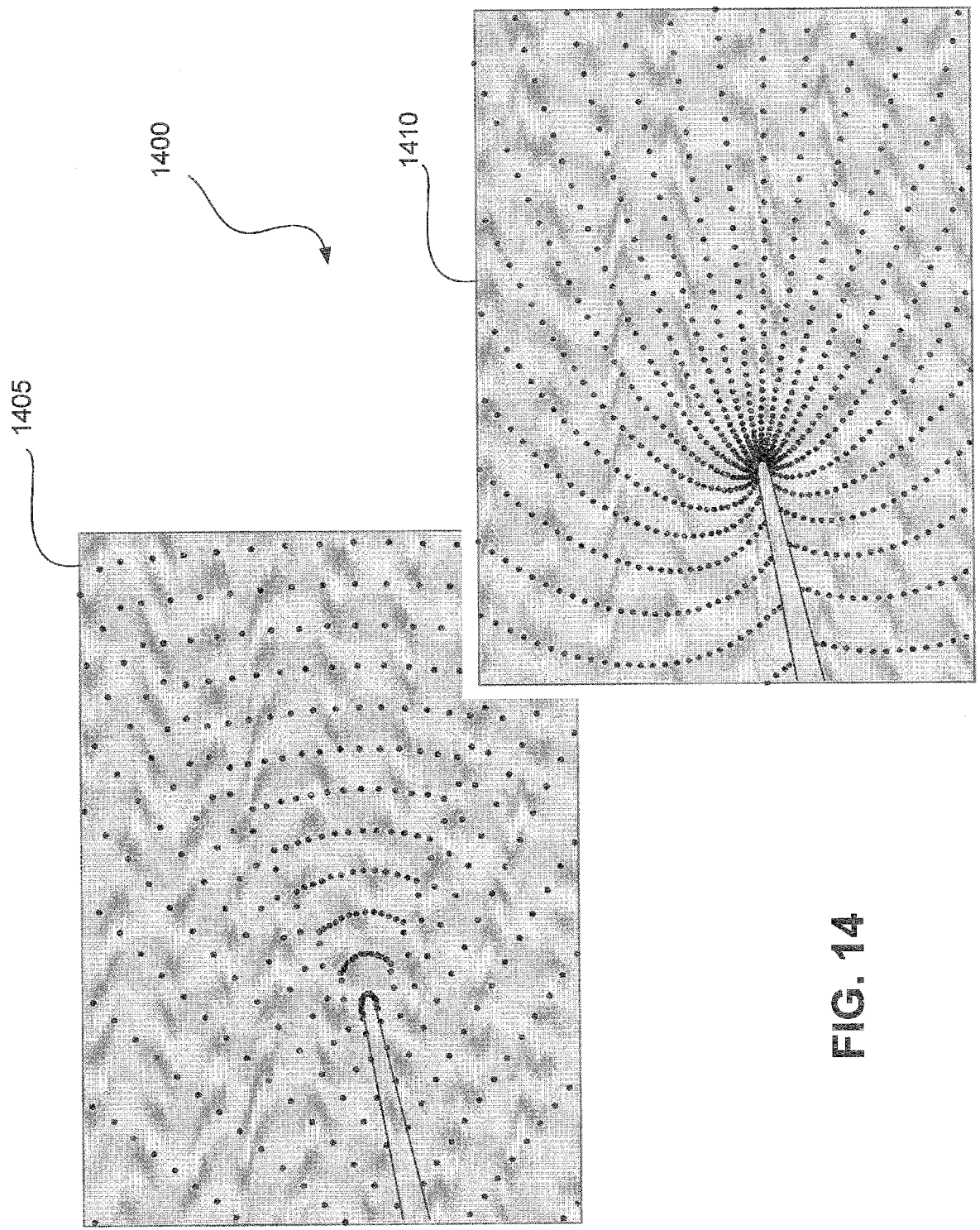
FIG. 14 illustrates the trailing edge of the airfoil in FIG. 12.

FIGS. 12-14 illustrate examples of computation meshes 1200, 1300, 1400 generated for the airfoil illustrated in FIGS. 9-32, above. Computation meshes 1200, 1300, 1400 were determined using one or mesh equations that utilize a Jacobian Scaling Parameter that is not equal to 2. In these exemplary computation meshes, it is noted that while computation mesh 1200 illustrates the airfoil in its entirety, computation meshes 1300, 1400 illustrate only the leading edge and the trailing edge, respectively. Computation mesh 1200 includes an initial grid 1205 and a final grid 1210. Computation mesh 1300 includes an initial grid 1305 and a final grid 1310 having grid points that correspond to the leading edge of the airfoil illustrated in FIG. 12. Computation mesh 1400 includes an initial grid 1405 and a final grid 1410 having grid points that correspond to the leading edge of the airfoil illustrated in FIG. 12.

It is demonstrated that a system and method in accordance with the present disclosure generates a grid for a computation mesh having substantially more uniformly located grid points. Comparing the final meshes 910 and 1210, it is noted that final mesh 1210 includes a greater number of grid points near the corners of the outer boundaries. The increased number of grid points indicates that the one or more mesh equations in accordance with the present disclosure generates a grid more aptly suited for one of the many analytical tools. By increasing the number of grid points near the corners in a computation mesh (e.g., computation mesh 1210), a system and method in accordance with the present disclosure offers an automated solution for generating a quality grid without additional user interface.

Turning next to final meshes 1010 and 1310, it is noted that final mesh 1210 includes a greater number of grid points around the leading edge of the airfoil. It is further noted that the grid points provided are more densely arranged and more uniformly spaced around the leading edge than those grid points in final mesh 1010. These superior properties are further noted with respect to final mesh 1410, as compared with final mesh 1210. As with the leading edge of the airfoil, it is noted that the trailing edge of the airfoil also includes grid points that are also more densely arranged and uniformly spaced. As is recognized in the art, a densely spaced mesh that is dense near the edges, yet uniformly spaced outward from the inner boundary to the outer boundary, provides a superior analytical framework when used in connection with an analytical tool.

Figure 15:
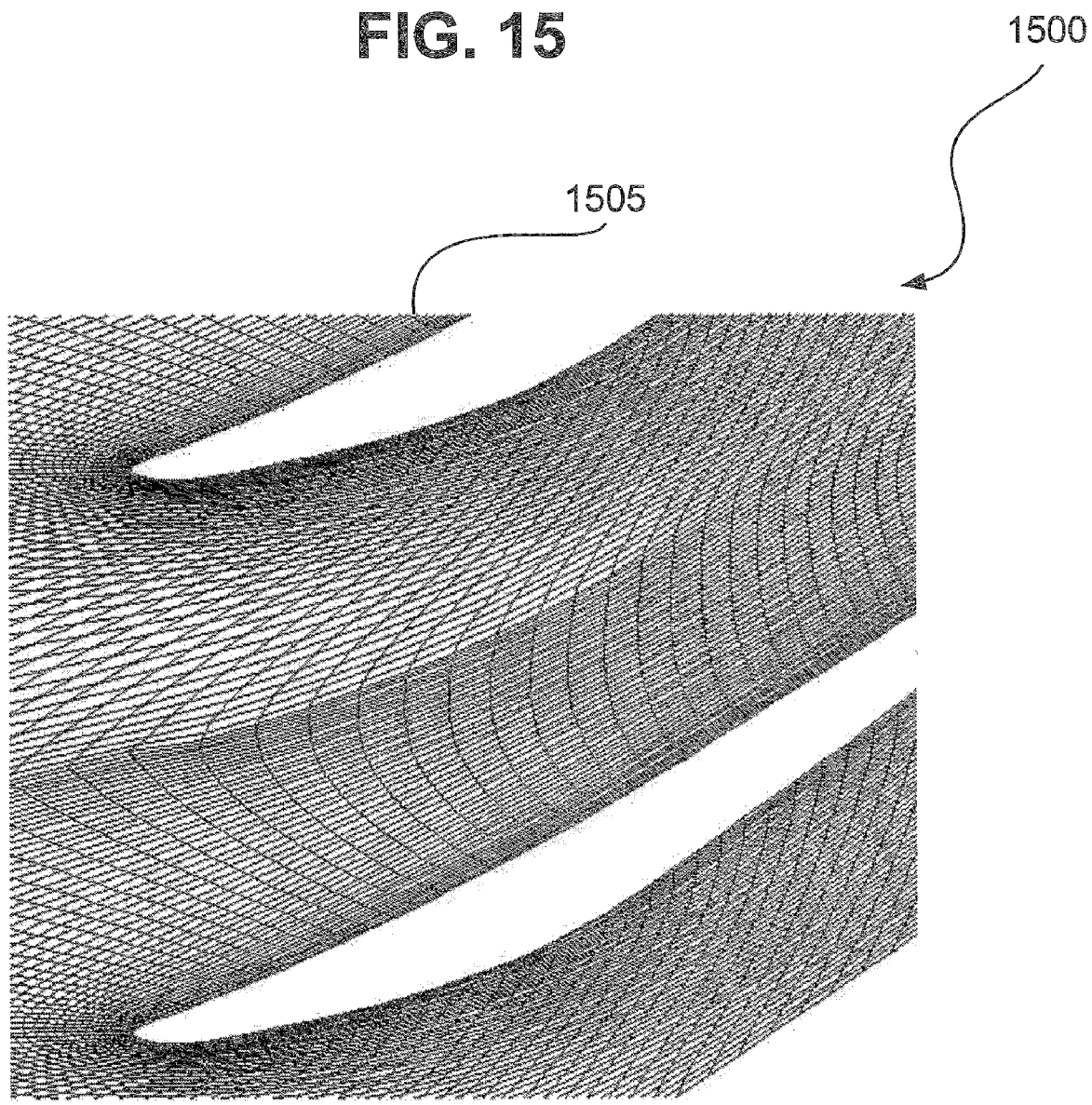
FIG. 15 illustrates an airfoil with an example of a computation mesh generated with a prior art method.
Figure 16:
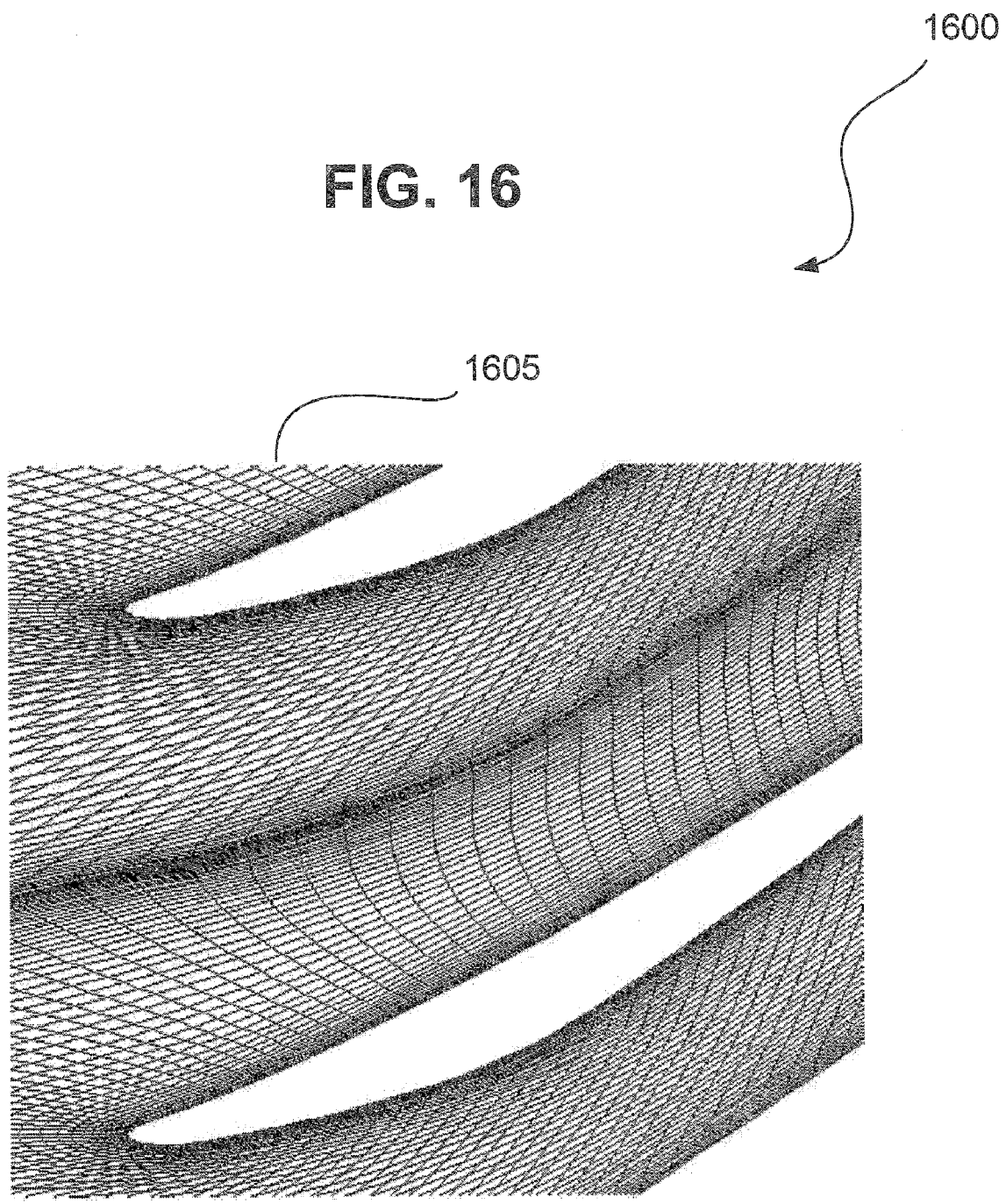
FIG. 16 illustrates an airfoil with a computation mesh generated according to one implementation of the present disclosure.

FIGS. 15 and 16 illustrate exemplary computation meshes 1500, 1600 for turbine blades. Computation mesh 1500 includes a grid 1505 having grid points determined using one or more mesh equations that are known in the art. Computation mesh 1600 includes grid 1605 having grid points determined using one or more mesh equations that include a Jacobian scaling parameter that is not equal to two. Comparing the meshes illustrated in FIGS. 15 and 16, it is noted that the grid points are more densely clustered in computation mesh 1600 around the boundary of the turbine blade. This dense clustering is indicated by the dark colors that appear uniformly around the entire turbine blade. It is generally recognized that this clustering arrangement is ideal for use with analytical tools. It is further noted that computation mesh 1600 was generated utilizing one or more mesh equations that include a Jacobian scaling parameter that is not equal to two.

Figure 17:
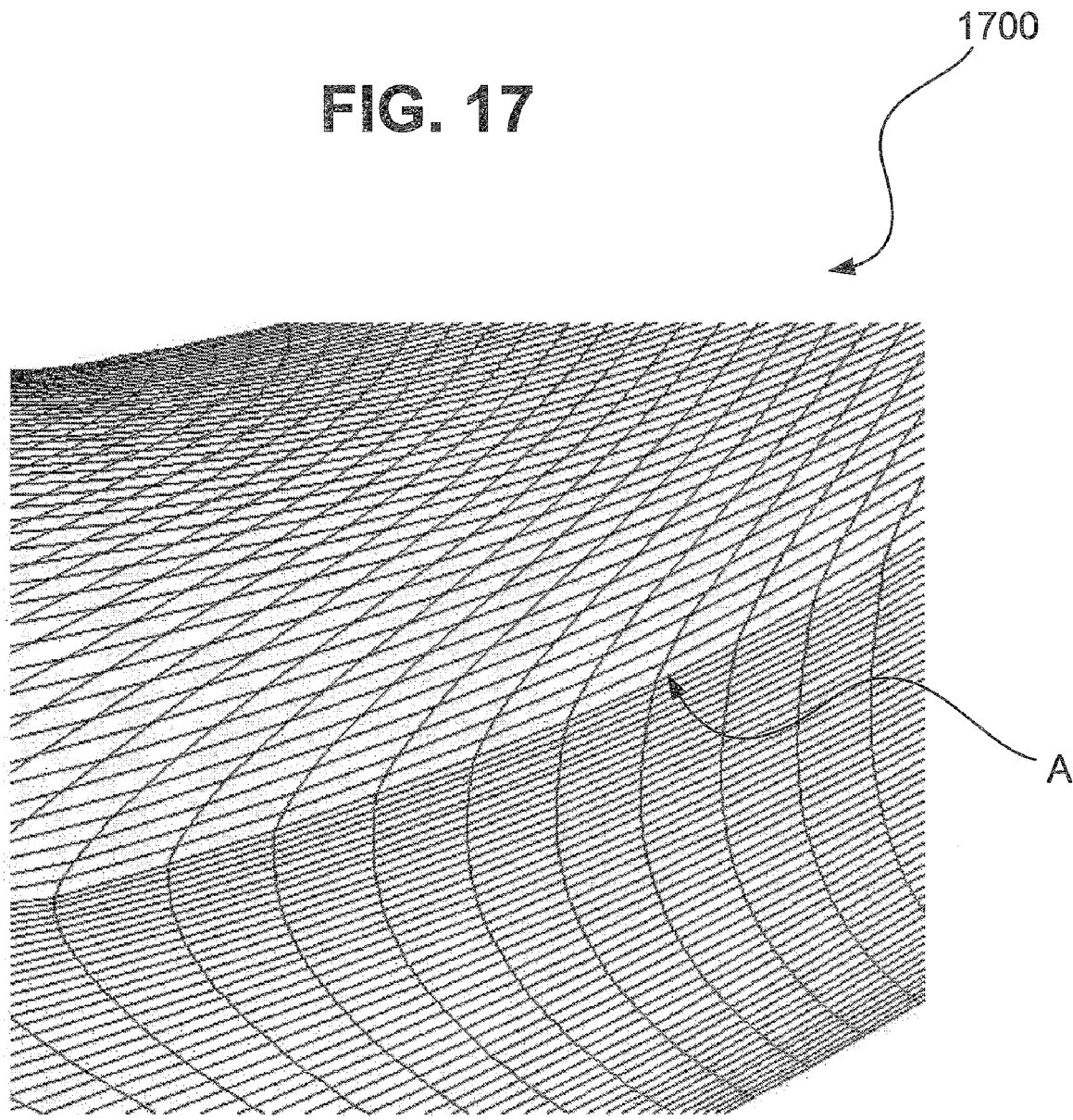
FIG. 17 illustrates a computation mesh generated with a prior art method.
Figure 18:
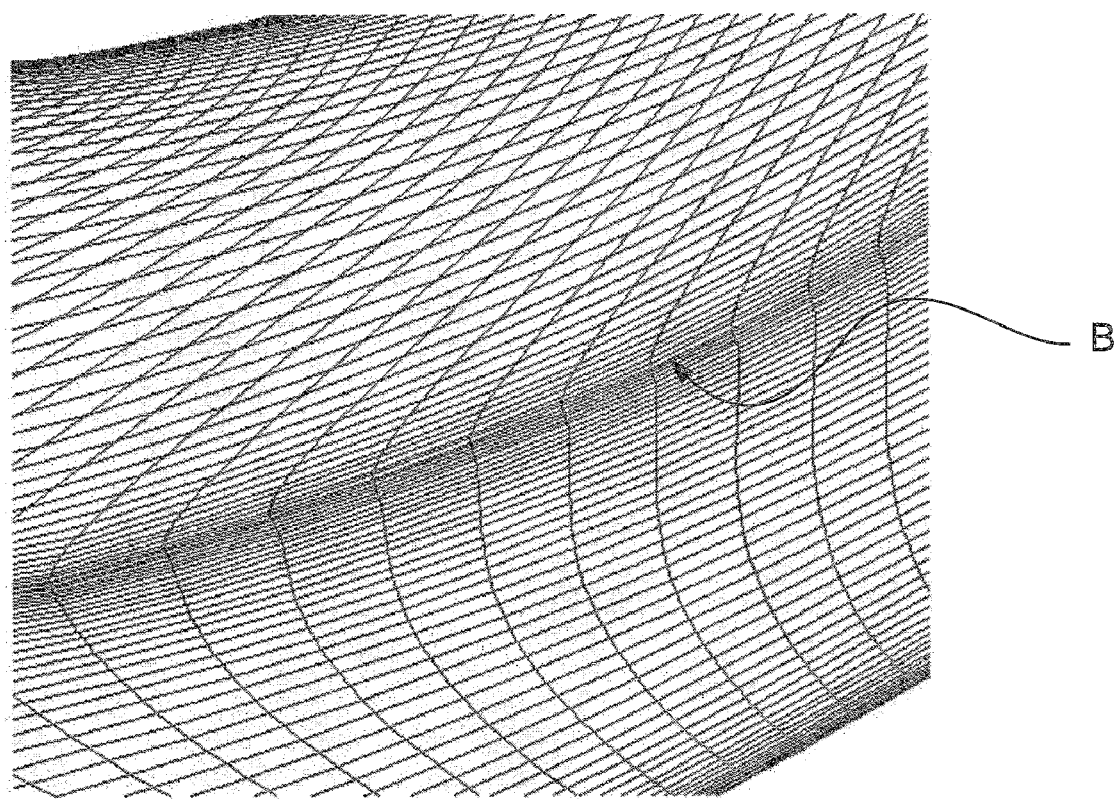
FIG. 18 illustrates an example of a computation mesh generated according to one implementation of the present disclosure.

FIGS. 17 and 18 illustrate exemplary computation meshes 1700, 1800 for the turbine blades illustrated in FIGS. 15 and 16. Mesh 1700 was determined using a prior art mesh equation. Mesh 1800 was determined using one or more mesh equations having a Jacobian scaling parameter that is not equal to 2. Comparing the meshes illustrated in FIGS. 17 and 18, it is noted that the grid points at the outer boundary (as indicated by A and B, respectively) are more densely clustered in computation mesh 1800. As discussed before, this dense clustering is indicated by the dark colors that appear uniformly at the outer boundary.

FIGS. 9-39 18 demonstrate the improvements in the spacing and uniformity of the grid points in a computation mesh generated using a system and or method in accordance with the present disclosure. It is further noted that, although one or more mesh equations known in the art might generate a quality computation mesh through appropriate selection of parameters, these parameters cannot be adjusted without repeating the grid generation procedure in its entirety. In contrast, a significant improvement of an embodiment of a system and method in accordance with the present disclosure provides a computation mesh having the flexibility to be adjusted without significant computational implications.

Example Iterative Methods

Figure 19:
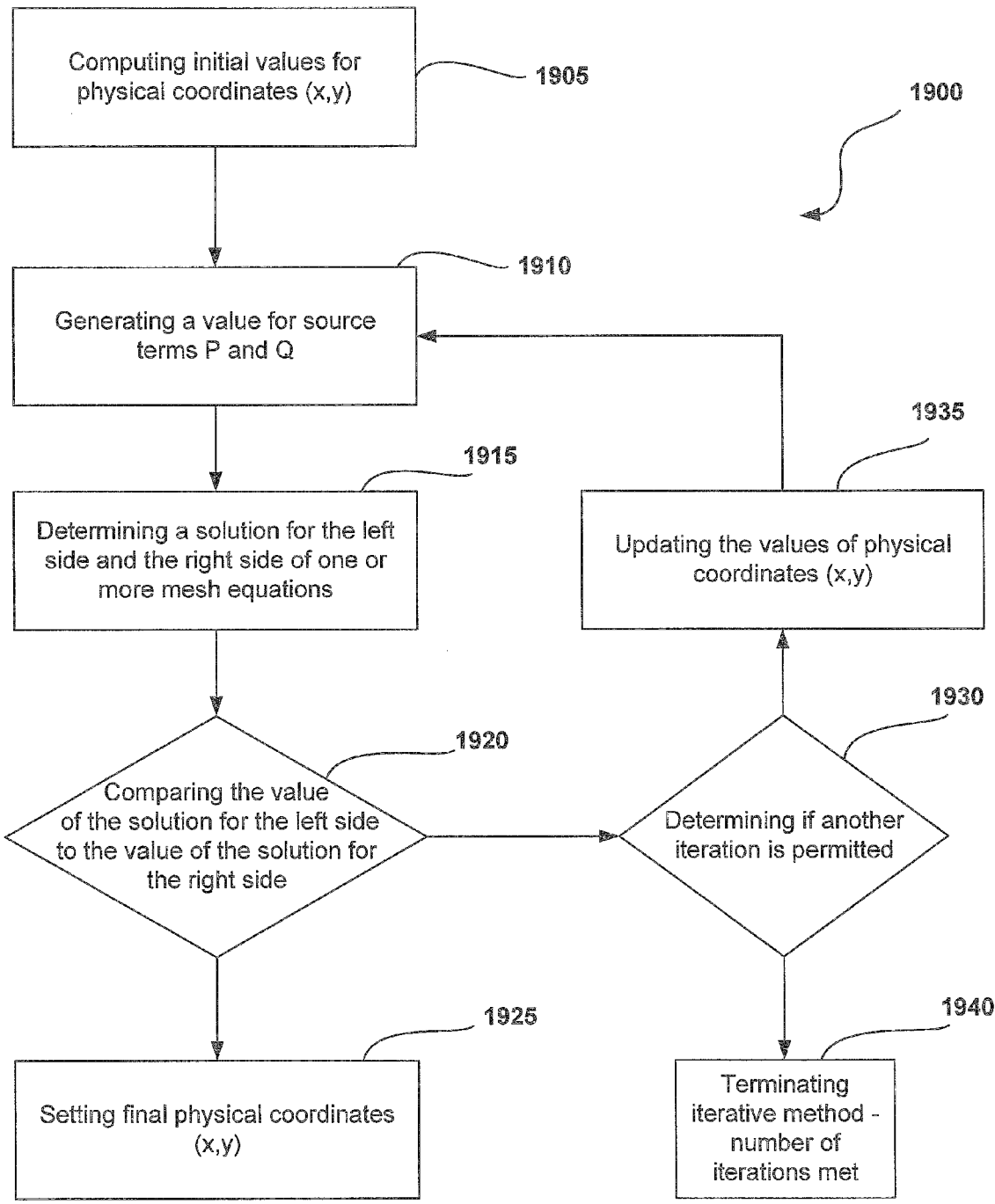
FIG. 19 illustrates an example of an iterative method for solving one or more mesh equations.

FIG. 19 illustrates one implementation of an iterative method 1900 that may be used to solve one or more mesh equations. Iterative method 1900, at stage 1905, includes computing initial values for physical coordinates (x,y) for each of the grid points in the computation mesh. An initial value is a mathematical estimate that is used to solve one or more mesh equations. Examples of an initial value include, but are not limited to, a guess, an approximation, a random selection, a mathematical solution and any combination thereof. In one example, the initial values for each of the physical coordinates (x,y) are determined using a mathematical technique. Examples of such techniques include, but are not limited to, a random selection technique, an interpolation technique, a curve-fitting method and any combinations thereof. Although the remainder of this disclosure will discuss embodiments of a first-point distance parameter system and method in connection with an interpolation technique, it is contemplated that these embodiments can also employ any of the other techniques for selecting and/or determining initial values of physical coordinates (x,y).

There are a variety of interpolation techniques that are known in the art. In general, an interpolation technique is a method of generating values for a variable from a discrete set of known values for similar variables. Examples of interpolation techniques include, but are not limited to, vertical interpolation, horizontal interpolation, tensor product interpolation, transfinite interpolation, among others. In one example, an iterative mathematical method uses a transfinite interpolation technique to determine the initial values for each of the physical coordinates (x,y).

A transfinite interpolation technique determines the initial values of physical coordinates for the remaining grid points of the computation mesh from a discrete set of known physical coordinates (x,y). In one implementation, a discrete set of known physical coordinates (x,y) includes one or more grid points located proximate an inner and an outer boundary. In one example, a discrete set includes physical coordinates (x,y) determined using an inner boundary distance parameters. In another example, a discrete set includes physical coordinates (x,y) determined using an outer boundary parameter $D_M$.

The physical coordinates (x,y) of the remaining grid points of a computation mesh can be computed by applying the generally recognized principles of interpolation techniques. Accordingly, although broadly defined, a more technical discussion of an interpolation technique method, such as an transfinite interpolation technique, and the mathematical techniques associated with the application of such method to elliptic grid generation is available in open literature and engineering text, such as, for example, Computation Fluid Mechanics and Heat Transfer, Hemisphere Publishing Company (1994), incorporated herein by reference in its entirety.

At step 1910, iterative method 1900 includes generating a value for source terms P and Q using the initial values of physical coordinates (x,y) for the grid points. In one example, a value for the first order derivates $x_\xi$, $x_\eta$, $y_\xi$ and $y_\eta$ and second-order derivatives $x_{\xi\xi}$, $x_{\eta\eta}$, $y_{\xi\xi}$, $x_{\xi\eta}$, $y_{\xi\eta}$ is determined as a function of the initial values of physical coordinates (x,y). Sources p, q, r and s are determined using these values. Based on the discussion above, it follows that values for sources p, q, r and s are used to generate values of sources P and Q.

At step 1915, iterative method 1900 includes determining a solution for the left side and a solution for the right side of Equations 3 and 4. For purposes of simplifying the discussion, the mesh equations (e.g., Equations 3 and 4) can be re-written as:

$$H_1 = Z_1 \quad \text{Equation (31)}$$

$$H_2 = Z_2 \quad \text{Equation (32)}$$

where $H_1$ and $H_2$ are the left side of the equations and $Z_1$ and $Z_2$ are the right side of the equations. The right side of Equations 3 and 4 may have a known solution (e.g., zero). On the contrary, the solution for the left side of the equation (e.g., $H_1$ and $H_2$) are not known. In one implementation, $H_1 = g_{22}x_{\xi\xi} + g_{11}x_{\eta\eta} - 2g_{12}x_{\xi\eta} + J^2(Px_\xi + Qx_\eta)$ and $H_2 = g_{22}y_{\xi\xi} + g_{11}y_{\eta\eta} - 2g_{12}y_{\xi\eta} + J^2(Py_\xi + Qy_\eta)$, the components of which are described in detail above. A value for $H_1$ and $H_2$ can be determined by substituting the values of the first-order derivates $x_\xi$, $x_\eta$, $y_\xi$ and $y_\eta$, the second-order derivatives $x_{\xi\xi}$, $x_{\eta\eta}$, $y_{\xi\xi}$, $y_{\eta\eta}$, $x_{\xi\eta}$, $y_{\xi\eta}$ and the source terms P and Q determined above.

A feature of an iterative method is the ability to generate values for physical coordinates (x,y) that result in the value of the left side being equal to the value of the right side of the one or more mesh equations. At step 1920, iterative method 1900 includes comparing the value of the left side to the value of the right side of the one or more mesh equations (e.g., Equations 3 and 4). If the value of the left side (e.g., $H_1$, $H_2$) equals the value of the right side (e.g., $Z_1$, $Z_2$), then at stage 1925, method 1900 includes setting the values for the final physical coordinates (x,y). In the present example, the initial values of physical coordinates (x,y) for the grid points determined in stage 1905 are the final physical coordinates (x,y). The final physical coordinates (x,y) satisfy the one or more mesh equations (e.g., Equations 3 and 4) and can be used to describe the point locations for the grid points of the computation mesh.

If the value of the left side (e.g., $H_1$, $H_2$) does not equal the value of the right side (e.g., $Z_1$, $Z_2$), then at stage 1930, iterative method 1900 includes determining if another iteration is required. It is typical that the left side and the right side of mesh equations similar to the one or more mesh equations of the present disclosure to never be equal. In order to avoid the iterative method continuing for excessive iterations, one or more terminating criteria that determine whether additional iterations are necessary may be used.

In one example, a terminating criteria is an error value that measures the difference between the value of the physical coordinates (x,y) during the present iteration and the value of the physical coordinates (x,y) during the previous iterations. In general terms and for purposes of simplifying the discussion, an error value can be written as:

$$\text{Error}X = X^n - X^{n-1} \quad \text{Equation (33)}$$

$$\text{Error}Y = Y^n - Y^{n-1} \quad \text{Equation (34)}$$

where ErrorX and ErrorY are error values; $X^n$ and $Y^n$ are the value of physical coordinates (x,y) during the present iteration stored in a coordinate matrix; and $X^{n-1}$ and $y^{n-1}$ are the value of physical coordinates (x,y) during the previous iteration stored in a coordinate matrix. In one example, a first-point distance parameter system and method may include a single error value, such that ErrorX=ErrorY=Error Value.

In operation, if iterative method 1900 determines that the values of ErrorX and ErrorY are both less than a terminating criteria, then the final value of the physical coordinates (x,y) is the value of the physical coordinates (x,y) during the present iteration (e.g., X(i,j) and Y(i,j)). If on the other hand, iterative method 1900 determines that the values of ErrorX or ErrorY or both are not less than a terminating criteria, then at stage 1935, iterative method 1900 includes updating the values of physical coordinates (x,y). Iterative method 1900 continues with another iteration where the values of physical coordinates (x,y) that are stored in the coordinate matrix are modified. In one example, the values of the physical coordinates (x,y) are increased by the value of ErrorX and ErrorY. In another example, the value of the physical coordinates (x,y) are decreased by the value of ErrorX and ErrorY. In still another example, the value of the physical coordinates (x,y) are modified by a percentage of the value of ErrorX and ErrorY.

As illustrated in FIG. 19, the modified values of the physical coordinates (x,y) are used to generate new values for source terms P and Q, first-order derivates $x_\xi$, $x_\eta$, $y_\xi$ and $y_\eta$ and second-order derivates $x_{\xi\xi}$, $x_{\eta\eta}$, $y_{\xi\xi}$, $y_{\eta\eta}$, $x_{\xi\eta}$, $y_{\xi\eta}$. These values are used to solve the one or more mesh equations as described above. Alternatively, at stage 1940, method 1900 includes terminating the iterative method when the number of iterations is met. An iterative method may continue until a value for the physical coordinates (x,y) is found so as to meet the terminating criteria. In an alternative example, a first-point distance parameter system and method may include a terminating criteria that limits the number of iterations for any given set of input parameters. In the present example, by limiting the number of iterations, the iterative method will only run up until a fixed number of values of physical coordinates (x,y) are determined.

Figure 20A:
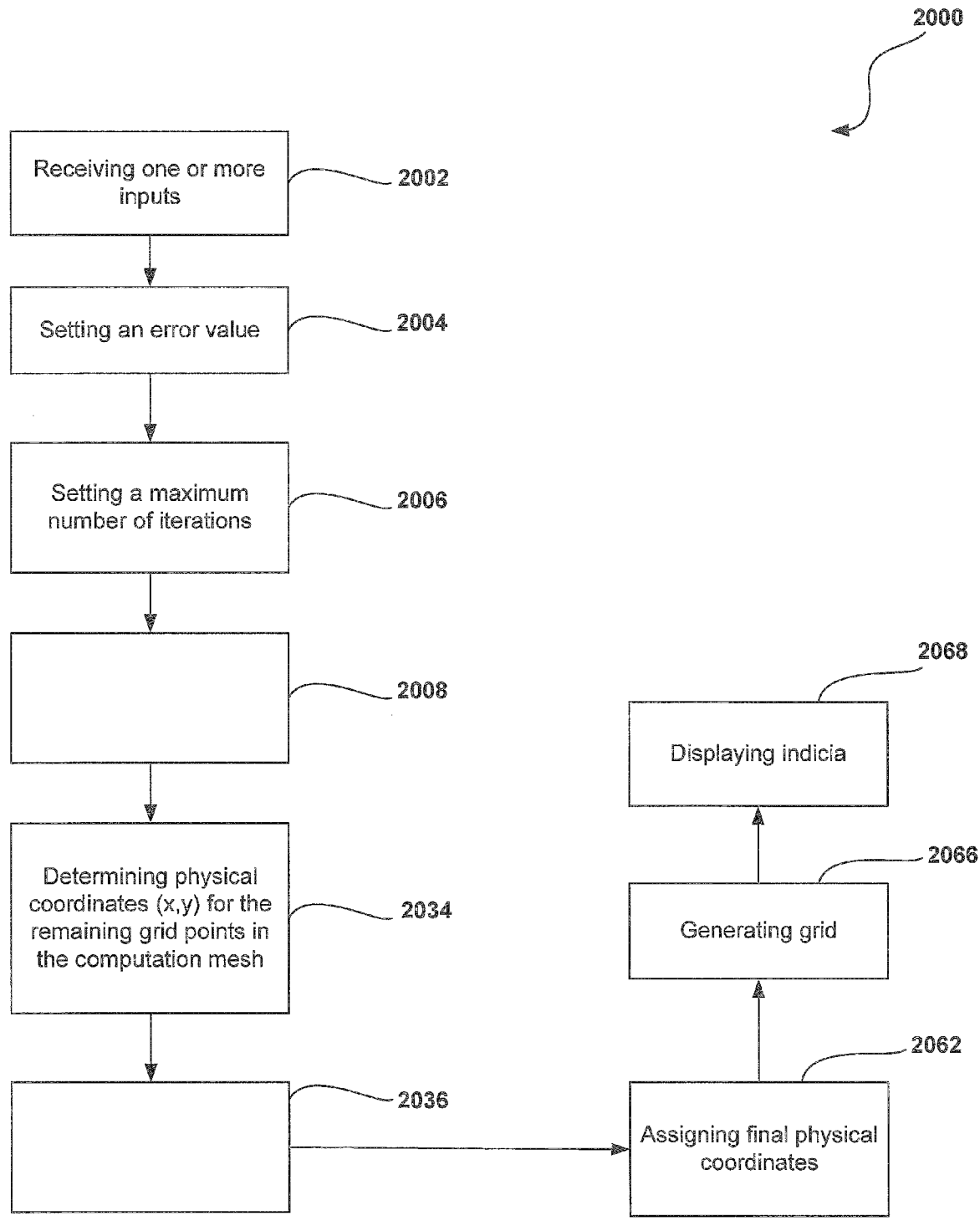
FIG. 20A to 20C illustrate an implementation of a computer-implemented method and system for automatically generating a computation mesh.
Figure 20B:
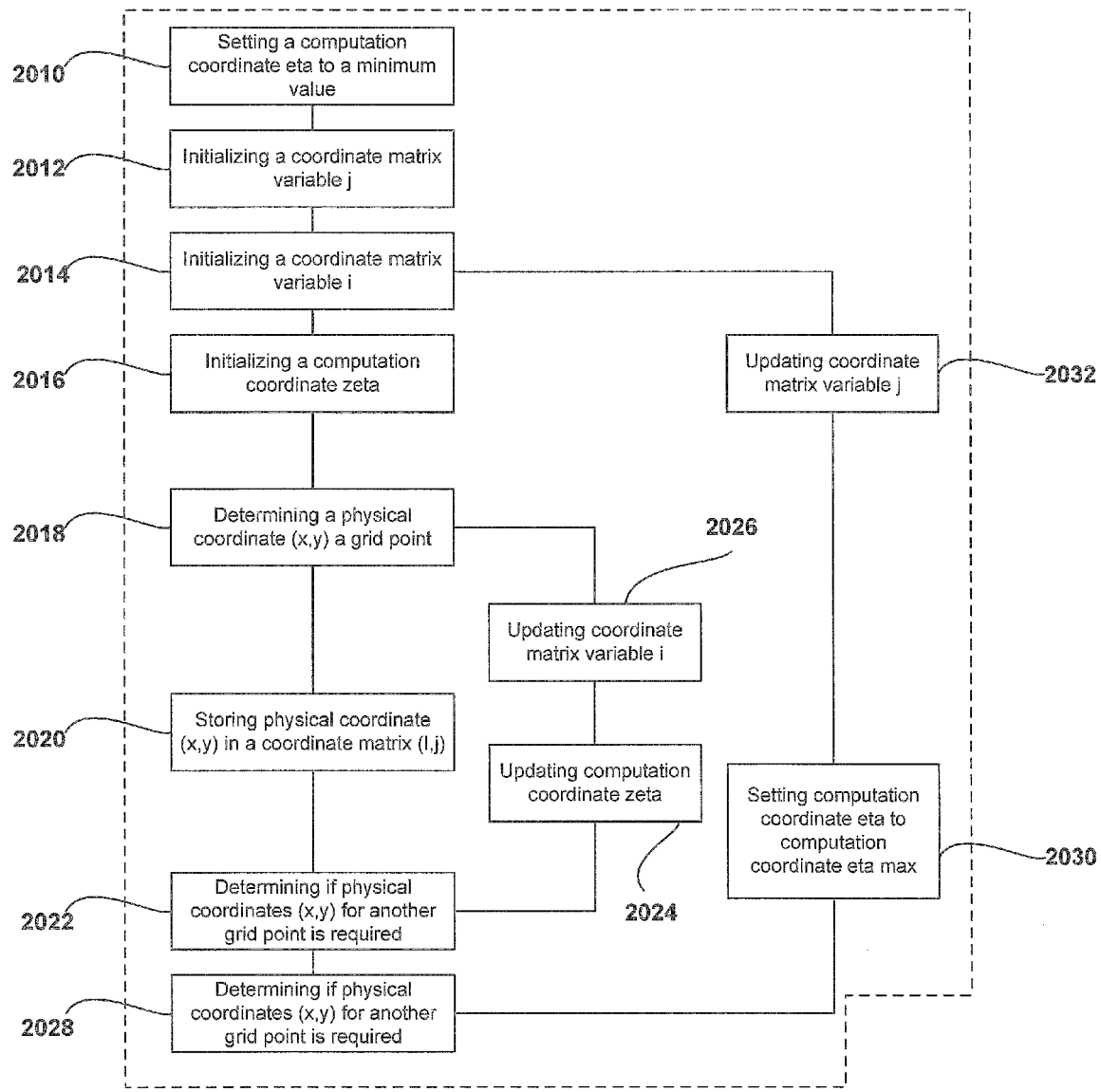
Figure 20C:
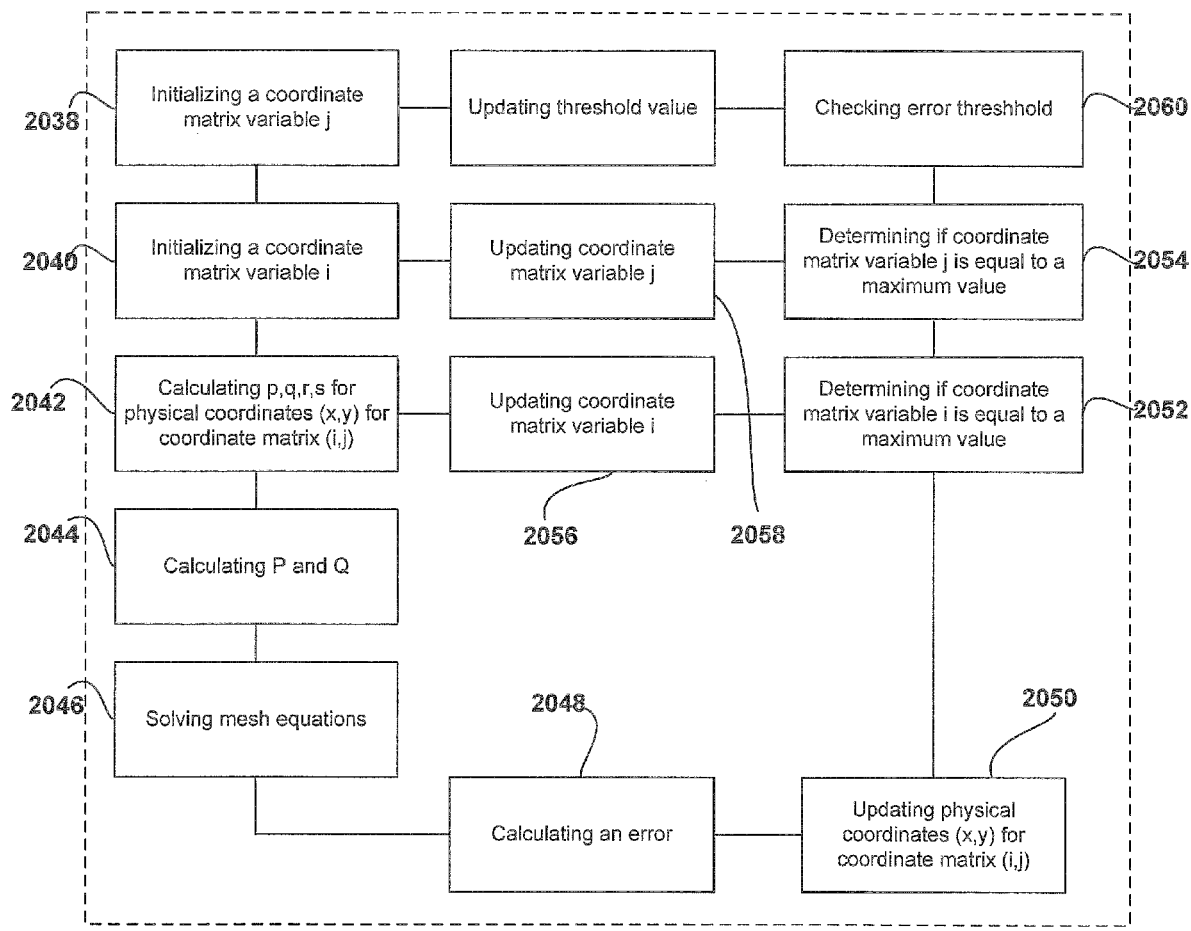

FIGS. 20A, 20B, and 20C illustrate another exemplary implementation 2000 of a method that generates a computation mesh using one or more mesh equations as described herein. Considering the mathematical techniques discussed above, method 2000, at stage 2002, includes receiving one or more inputs. An input includes, but is not limited to, a shape, a mesh parameter (e.g., M and N), a terminating criteria, a maximum number of iterations and any combination thereof.

It is contemplated that method 2000 may include any number of inputs, as desired and that comports with the application and implementation of such system and or method. Accordingly, the quantity and selection of these inputs may be based on the desired functionality of a computer-implementation of a method (e.g., method 300, 2000) as described herein.

At stage 2004, method 2000 includes setting an error value. An error value can be equal to the terminating criteria, such as, for example, when the terminating criteria is equal to the difference between a first set of physical coordinates (x,y) and a second set of physical coordinates (x,y), as described above. Alternatively, an error value can be provided by the computer-implementation of a system and or method in accordance with the present disclosure. When the error value is provided, a user or user input is not required.

At stage 2006, method 2000 includes setting a maximum number of iterations. A number of iterations is used determine when method 2000 is unable to determine a suitable value for physical coordinates (x,y) so as to solve the one or more mesh equations. Like the error value, the number of iterations can be provided by the end user. In other instances, the number of iterations is provided within the computer-implementation so user input is not required.

To determine each of the physical coordinates, method 2000 can apply a step-wise approach. By incrementally increasing a computation coordinate $\xi$ and a computation coordinate $\xi$, method 2000 determines the physical location (x,y) for each of the grid points in the computation mesh. At stage 2008, method 2000 includes determining the physical coordinates (x,y) for each of the grid points located along the inner and outer boundary of the computation mesh. At stage 2010, method 2000 includes setting computation coordinate $\eta$ to a minimum value. The minimum value to determine the physical coordinates along the inner boundary is 1. By setting the computation coordinate $\eta$ to 1, method 2000 can determine the physical coordinates (x,y) for each of the grid points proximate the inner boundary. Alternatively, by setting the computation coordinate $\eta$ to a maximum value, e.g., $\eta_{MAX}$, method 2000 can determine the physical coordinates (x,y) for each of the grid points proximate the outer boundary.

As discussed above, a coordinate matrix can be used to store the calculated values of physical coordinates for each of the grid points of a computation mesh. In the present example, the coordinate matrix is a two-dimensional matrix. Each position inside the coordinate matrix is described by two variables, e.g., (i,j). At stage 2012, method 2000 includes initializing a coordinate matrix variable j. At stage 2014, method 2000 includes initializing a coordinate matrix variable i. By initializing coordinate matrix variables i and j, method 2000 sets the first storage position within the coordinate matrix for storing the physical coordinates (x,y) for the first grid point in the computation mesh.

At stage 2016, method 2000 includes initializing a computation coordinate $\xi$. As described above, each of the grid points in a computation mesh have a grid location defined by a set of computation coordinates $(\xi,\eta)$. In the present example, in order to determine a set of physical coordinates (x,y) for the grid points along the inner and the outer boundaries, the computation coordinate $\eta$ will be held constant while the computation coordinate $\xi$ will be incremented. Accordingly, when determining physical coordinates (x,y) proximate the inner boundary, method 2000 initializes the computation coordinate $\xi$ for the first grid points within the computation mesh, e.g., $(\xi,\eta)=(1,1)$.

At stage 2018, method 2000 includes determining a physical coordinate (x,y) for a grid point having a grid location corresponding to the set of computation coordinates $(\xi,\eta)$. For the grid points proximate the inner boundary, e.g., when computation coordinate $\eta=1$, method 2000 calculates the physical coordinates (x,y) by using the first-order derivate equations discussed above:

$$[x_\eta]_{\eta_1} = \left[D_1(\xi)\frac{-x_\xi\cos\theta - y_\xi\sin\theta}{\sqrt{g_{11}}}\right]_{\eta_1} \quad \text{Equation (35)}$$

$$[y_\eta]_{\eta_1} = \left[D_1(\xi)\frac{-y_\xi\cos\theta - y_\xi\sin\theta}{\sqrt{g_{11}}}\right]_{\eta_1} . \quad \text{Equation (36)}$$

For the grid points proximate the outer boundary, e.g., when computation coordinate $\eta=\eta_{MAX}$, method 2000 calculates the physical coordinates (x,y) by using the first-order derivate equations discussed above:

$$[x_\eta]_{\eta_M} = \left[D_M(\xi)\frac{-x_\xi\cos\theta - y_\xi\sin\theta}{\sqrt{g_{11}}}\right]_{\eta_M} \quad \text{Equation (37)}$$

$$[y_\eta]_{\eta_M} = \left[D_M(\xi)\frac{-y_\xi\cos\theta - y_\xi\sin\theta}{\sqrt{g_{11}}}\right]_{\eta_M} \quad \text{Equation (38)}$$

At stage 2020, method 2000 includes storing physical coordinates (x,y). Method 2000 stores calculated values of a first-order derivate equations (e.g., Equations 31 to 35, above) in a position within the coordinate matrix corresponding to the grid points. In the present example, when computation coordinate $\eta=1$, then each of the physical coordinates (x,y) will be stored in a position within coordinate matrix corresponding to (i, 1), wherein coordinate matrix variable i changes for each value of computation coordinate $\xi$. On the other hand, when computation coordinate $\eta=\eta_{MAX}$, then each of the physical coordinates (x,y) will be stored in a position within coordinate matrix corresponding to (i, $j_{MAX}$), wherein coordinate matrix variable i changes for each value of computation coordinate $\xi$ and the value of $j_{MAX}$ is equal the number of grid points along the $\xi$-grid lines (M).

At stage 2022, method 2000 includes determining if physical coordinates (x,y) for another grid point proximate the inner boundary needs to be determined. In the present example, method 2000 considers whether the value for computation coordinate $\xi$ is equal to a maximum expected value, $\xi_{MAX}$. As discussed above, the maximum expected value for computation coordinate $\xi$ can be the number of grid points along a $\eta$-grid lines (N). If the value of computation coordinate $\xi$ is not equal to $\xi_{MAX}$, then method 2000, at stage 2024, includes updating the value of computation coordinate $\xi$ to reflect the next grid point in the computation mesh. In addition, method 2000, at stage 2026, includes updating the value of coordinate matrix variable i to reflect the next position in the coordinate matrix.

If the value of computation coordinate $\xi$ does equal $\xi_{MAX}$, then method 2000, at stage 2028, includes determining if physical coordinates (x,y) for another grid point proximate the outer boundary needs to be determined. In the present example, method 2000 considers whether the value for computation coordinate $\eta$ is equal to a maximum expected value, $\eta_{MAX}$. As discussed above, the maximum expected value for computation coordinate $\xi$ can be the number of grid points along a $\xi$-grid lines (M). If the value of computation coordinate $\eta$ is not equal to $\eta_{MAX}$, then method 2000, at stage 2030, includes setting computation coordinate $\eta=\eta_{MAX}$ to reflect grid points proximate the outer boundary. In addition, method 2000, at stage 2032, includes updating the coordinate variable j to reflect the position in the coordinate matrix that corresponds to the grid points proximate the outer boundary, e.g., $j=j_{MAX}$.

At stage 2034, method 2000 includes determining physical coordinates (x,y) for the remaining grid points in the computation mesh. In general, method 2000 will employ one or more interpolation techniques, such as the interpolation technique discussed above in relation to FIG. 4. Each of the values of physical coordinates (x,y) determined will be stored in the coordinate matrix. Although not discussed in detail herein, it is contemplated that the values of physical coordinates (x,y) will be stored in a coordinate matrix similar to the coordinate matrix discussed above. In one example, stage 2034 can employ techniques similar to those employed in stage 2008 discussed immediately above.

At stage 2036, method 2000 includes determining if the initial values of physical coordinates (x,y) determined in stages 2008 to 2034 satisfy the one or more mesh equations. If the initial values satisfy the mesh equations, then the values of the physical coordinates (x,y) are the final values and can be used to generate the grid of the computation mesh. In the more likely scenario, if the initial values do not satisfy the mesh equations, then an iterative method is employed to find values of physical coordinates (x,y) that satisfy the one or more mesh equations.

To find these values, method 2000 includes, at stage 2038 and at stage 2040, initializing the coordinate matrix variables i and j. As discussed above, these variables define the position within a coordinate matrix (i,j) for the physical coordinates (x,y) that correspond to the grid points of the computation mesh. For purposes of finding physical coordinates (x,y) that satisfy the one or more mesh equations, each of the physical coordinates (x,y) must be tested. Accordingly, by initializing these two variables i and j, tests the physical coordinates (x,y) stored in the first position of the coordinate matrix.

At stage 2042, method 2000 includes calculating p, q, r and s for physical coordinates (x,y) for a position in coordinate matrix (i,j). The sources p, q, r and s are used at stage 2044, where method 2000 includes determining source terms P and Q. The values for source terms P and Q correspond to the physical coordinates (x,y) for each of the grid points of the computation mesh. These source terms P and Q are incorporated at stage 2046, where method 2000 includes solving mesh equations utilizing physical coordinates (x,y) for a position in coordinate matrix (i,j), wherein the mesh equations include:

$$g_{22}x_{\xi\xi}+g_{11}x_{\eta\eta}-2g_{12}x_{\xi\eta}+J^2(Px_\xi+Qx_\eta)=0 \quad \text{Equation (39)}$$

$$g_{22}y_{\xi\xi}+g_{11}y_{\eta\eta}-2g_{12}y_{\xi\eta}+J^2(Py_\xi+Qy_\eta)=0 \quad \text{Equation (40)}$$

As discussed above, when solving the one or more mesh equations, method 2000 determines a value for the left side of the equation and a value for the right side of the equation for each of the physical coordinates (x,y) stored in the coordinate matrix (i,j). At stage 2048, method 2000 includes calculating an error based on these values. In one example, this error is equal to the difference between the value of the left side (e.g., H1) and the value of the right side (e.g., Z1) for each of Equations 31 and 32 above. The calculated error is assigned to an error variable. An error variable stores a calculated error. In one embodiment of method 2000, the variable is continually updated based upon error calculation for subsequent physical coordinates (x,y). Thus, in accordance with the present disclosure, if the error calculation for the present physical coordinates (x,y) is greater than the value of the error calculation for the prior physical coordinates (x,y), then the value of the error variable is updated to reflect the value of the error calculation for the present physical coordinates (x,y).

If the value of the left side does not equal the value of the rights side, then at stage 2050, method 2000 includes updating physical coordinates (x,y) for coordinate matrix location (i,j). The updated physical coordinates (x,y) can be done in a variety of ways. In one example, the value of the physical coordinates (x,y) are updated as a function of a mathematical equation. In another example, the value of the physical coordinates (x,y) are updated as a function of geometric equations.

At stages 2052 and 2054, method 2000 determines whether additional physical coordinates (x,y) must be tested, according to the stages discussed above. At stage 2052, method 2000 includes determining whether the coordinate matrix variable i is equal to a maximum value. This determination provides assurances that all of the physical coordinates (x,y) for a specified value of coordinate matrix variable j have been tested. If coordinate matrix variable i does not equal the maximum value, e.g., $i_{MAX}$, then at stage 2056, method 2000 includes increasing the value of i. In one example, increasing the value of i include i=i+1. If coordinate matrix variable i equals $i_{MAX}$, then at stage 2054, method 2000 include determine whether the coordinate matrix variable j is equal to a maximum value. This determination provides assurances that all of the physical coordinates (x,y) for a coordinate matrix (i,j) have been tested. If coordinate matrix variable j does not equal the maximum value, e.g., $j_{MAX}$, then at stage 2058, method 2000 includes increasing the value of j. In one example, increasing the value of j include j=j+1.

If coordinate matrix variable j equals the maximum value variable $j_{MAX}$, then at stage 2060, method 2000 includes checking an error threshold. An error threshold is a threshold which determines whether additional iterations of the iterative method are required. Although an error threshold can have any value, it is generally recognized that an error threshold has a value equal to the error value, mentioned above. In one implementation of 20method 2000, stage 2060 compares the value of the error variable with the value of the error threshold. If the value of the error variable does not exceed the error threshold, then at stage 2062, method 2000 includes assigning the existing values for physical coordinates (x,y) to a final set of physical coordinates (x,y). These final set of physical coordinates (x,y) are used in stages 2066 and 2068, where method 2050 includes generating the grid of the computation mesh and displaying at least one indicia, respectively.

If the value of the error variable exceeds the error threshold, the at stage 2054, method 2000 updates the iteration value and determines another set of physical coordinates (x,y) by repeating stages 2038 to 2064. Although not discussed in detail herein, the iteration value reflects the number of iterations allowed before a method in accordance with the present disclosure will not generate a computation mesh.

In the event that a grid is not generated, additional stages may be required so as to allow a user or the computer implementation of this method to change one or more of the limited input variables.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer-implemented method for automatically generating a computation mesh for use with an analytical tool, the computation mesh having a plurality of $\xi$-grid lines and $\eta$-grid lines intersecting at grid points positioned with respect to an inner boundary and an outer boundary, the method comprising:

receiving from a user information corresponding to a shape to be analyzed using the analytical tool;

solving, with a computer, one or more mesh equations for a plurality of point locations, the one or more mesh equations depending on a Jacobian scaling parameter that is from about 0.5 to less than 2;

generating the computation mesh as a function of the plurality of point locations; and outputting one or more indicia representing the computation mesh, wherein said solving one or more mesh equations includes relating a plurality of sources to the inner and outer boundaries according to:

$$J^2 p(\xi) = \left(\frac{J}{J_1}\right)^\lambda \left[R_1 \frac{y_\eta}{J_1} - R_2 \frac{x_\eta}{J_1}\right]_{\eta_1}$$

$$J^2 q(\xi) = \left(\frac{J}{J_1}\right)^\lambda \left[-R_1 \frac{y_\xi}{J_1} + R_2 \frac{x_\xi}{J_1}\right]_{\eta_1}$$

$$J^2 r(\xi) = \left(\frac{J}{J_M}\right)^\lambda \left[R_3 \frac{y_\eta}{J_M} - R_4 \frac{x_\eta}{J_M}\right]_{\eta_M}$$

$$J^2 s(\xi) = \left(\frac{J}{J_M}\right)^\lambda \left[-R_3 \frac{y_\xi}{J_M} + R_4 \frac{x_\xi}{J_M}\right]_{\eta_M}$$

where J identifies a Jacobian defining a cell area of a grid cell located within the interior of a grid of the computation mesh; $J_1$ identifies a Jacobian evaluated at the inner boundary; $J_M$ identifies a Jacobian evaluated at the outer boundary; $\lambda$ identifies the Jacobian scaling parameter; $p(\xi)$, $q(\xi)$, $r(\xi)$ and $s(\xi)$ are sources; and $R_1$, $R_2$, $R_3$ and $R_4$ are curvature terms.

2. A method according to claim 1, wherein the Jacobian scaling parameter has a value that is from 0.5 to less than 2.

3. A method according to claim 1, wherein the Jacobian scaling parameter has a value that is equal to about 1.25.

4. A method according to claim 1, wherein the Jacobian scaling parameter has a value that is equal to 1.25.

5. A method according to claim 1, wherein the curvature terms are defined according to:

$$R_1 = -\lfloor g_{22} x_{\xi\xi} - 2g_{12} x_{\xi\eta} + g_{11} x_{\eta\eta} \rfloor_{\eta_1}$$

$$R_2 = -\lfloor g_{22} y_{\xi\xi} - 2g_{12} y_{\xi\eta} + g_{11} y_{\eta\eta} \rfloor_{\eta_1}$$

$$R_3 = -\lfloor g_{22} x_{\xi\xi} - 2g_{12} x_{\xi\eta} + g_{11} x_{\eta\eta} \rfloor_{\eta_M}$$

$$R_4 = -\lfloor g_{22} y_{\xi\xi} - 2g_{12} y_{\xi\eta} - g_{11} y_{\eta\eta} \rfloor_{\eta_M}.$$

6. A method according to claim 1, wherein said receiving step includes receiving a $\xi$-grid line mesh parameter value corresponding to a desired number of $\xi$-grid lines for the computation mesh and an $\eta$-grid line mesh parameter value corresponding to a desired number of $\eta$-grid lines for the computation mesh.

7. A method according to claim 6, wherein said generating step occurs without the need for additional information from the user.

8. A system for generating a computation mesh for use with an analytical tool, the computation mesh including a plurality of $\xi$-grid lines and $\eta$-grid lines that intersect at grid points, the grid points positioned with respect to an inner boundary and an outer boundary, the system comprising:

a means for receiving a shape to be analyzed using the analytical tool;

a means for solving one or more mesh equations for a plurality of point locations, the computational means including a storage device having stored therein one or more mesh equations that depend on a Jacobian scaling parameter that has a value that is from about 0.5 to less than 2;

a means for generating the computation mesh as a function of the plurality of point locations; and a means for outputting one or more indicia representing the computation mesh, wherein the one or more mesh equations include a relation of a plurality of sources to the inner and outer boundaries according to:

$$J^2 p(\xi) = \left(\frac{J}{J_1}\right)^\lambda \left[R_1 \frac{y_\eta}{J_1} - R_2 \frac{x_\eta}{J_1}\right]_{\eta_1}$$

$$J^2 q(\xi) = \left(\frac{J}{J_1}\right)^\lambda \left[-R_1 \frac{y_\xi}{J_1} + R_2 \frac{x_\xi}{J_1}\right]_{\eta_1}$$

$$J^2 r(\xi) = \left(\frac{J}{J_M}\right)^\lambda \left[R_3 \frac{y_\eta}{J_M} - R_4 \frac{x_\eta}{J_M}\right]_{\eta_M}$$

$$J^2 s(\xi) = \left(\frac{J}{J_M}\right)^\lambda \left[-R_3 \frac{y_\xi}{J_M} + R_4 \frac{x_\xi}{J_M}\right]_{\eta_M}$$

where J identifies a Jacobian defining a cell area of a grid cell located within the interior of a grid of the computation mesh; $J_1$ identifies a Jacobian evaluated at the inner boundary; $J_M$ identifies a Jacobian evaluated at the outer boundary; $\lambda$ identifies the Jacobian scaling parameter; $p(\xi)$, $q(\xi)$, $r(\xi)$ and $s(\xi)$ are sources; and $R_1$, $R_2$, $R_3$ and $R_4$ are curvature terms.

9. A system according to claim 8, wherein the Jacobian scaling parameter has a value that is equal to about 1.25.

10. A system according to claim 8, wherein the curvature terms are defined according to:

$$R_1 = -\lfloor g_{22} x_{\xi\xi} - 2g_{12} x_{\xi\eta} + g_{11} x_{\eta\eta} \rfloor_{\eta_1}$$

$$R_2 = -\lfloor g_{22} y_{\xi\xi} - 2g_{12} y_{\xi\eta} + g_{11} y_{\eta\eta} \rfloor_{\eta_1}$$

$$R_3 = -\lfloor g_{22} x_{\xi\xi} - 2g_{12} x_{\xi\eta} + g_{11} x_{\eta\eta} \rfloor_{\eta_M}$$

$$R_4 = -\lfloor g_{22} y_{\xi\xi} - 2g_{12} y_{\xi\eta} - g_{11} y_{\eta\eta} \rfloor_{\eta_M}.$$

11. A machine-readable medium containing machine readable instructions for performing a method of generating a computation mesh for use with an analytical tool, the computation mesh having a plurality of $\xi$-grid lines and $\eta$-grid lines that intersect at grid points positioned with respect to an inner boundary and an outer boundary, the machine-readable instructions comprising:

a set of instructions for receiving from a user information corresponding to a shape to be analyzed using the analytical tool;

a set of instructions for solving one or more mesh equation for a plurality of point locations, the one or more mesh equations depending on a Jacobian scaling parameter that has a value that is from about 0.5 to less than 2;

a set of instructions for generating the computation mesh as a function of the plurality of point locations; and a set of instructions for outputting one or more indicia representing the computational mesh, wherein the one or more mesh equations include a relation of a plurality of sources to the inner and outer boundaries according to:

$$J^2 p(\xi) = \left(\frac{J}{J_1}\right)^\lambda \left[R_1 \frac{y_\eta}{J_1} - R_2 \frac{x_\eta}{J_1}\right]_{\eta_1}$$

$$J^2 q(\xi) = \left(\frac{J}{J_1}\right)^\lambda \left[-R_1 \frac{y_\xi}{J_1} + R_2 \frac{x_\xi}{J_1}\right]_{\eta_1}$$

$$J^2 r(\xi) = \left(\frac{J}{J_M}\right)^\lambda \left[R_3 \frac{y_\eta}{J_M} - R_4 \frac{x_\eta}{J_M}\right]_{\eta_M}$$

$$J^2 s(\xi) = \left(\frac{J}{J_M}\right)^\lambda \left[-R_3 \frac{y_\xi}{J_M} + R_4 \frac{x_\xi}{J_M}\right]_{\eta_M}$$

where J identifies a Jacobian defining a cell area of a grid cell located within the interior of a grid of the computation mesh; $J_1$ identifies a Jacobian evaluated at the inner boundary; $J_M$ identifies a Jacobian evaluated at the outer boundary; $\lambda$ identifies the Jacobian scaling parameter; $p(\xi)$, $q(\xi)$, $r(\xi)$ and $s(\xi)$ are sources; and $R_1$, $R_2$, $R_3$ and $R_4$ are curvature terms.

12. A machine-readable medium according to claim 11, wherein the Jacobian scaling parameter has a value that is equal to about 1.25.

13. A machine-readable medium according to claim 11, wherein the Jacobian scaling parameter has a value that is equal to 1.25.

14. A machine-readable medium according to claim 11, wherein the curvature terms are defined according to:

$$R_1 = -\lfloor g_{22} x_{\xi\xi} - 2g_{12} x_{\xi\eta} + g_{11} x_{\eta\eta} \rfloor_{\eta_1}$$

$$R_2 = -\lfloor g_{22} y_{\xi\xi} - 2g_{12} y_{\xi\eta} + g_{11} y_{\eta\eta} \rfloor_{\eta_1}$$

$$R_3 = -\lfloor g_{22} x_{\xi\xi} - 2g_{12} x_{\xi\eta} + g_{11} x_{\eta\eta} \rfloor_{\eta_M}$$

$$R_4 = -\lfloor g_{22} y_{\xi\xi} - 2g_{12} y_{\xi\eta} - g_{11} y_{\eta\eta} \rfloor_{\eta_M}.$$

15. A machine-readable medium according to claim 11, wherein said set of instructions for receiving information includes a set of instructions for receiving a $\xi$-grid line mesh parameter value corresponding to a desired number of $\xi$-grid lines for the computation mesh and an $\eta$-grid line mesh parameter value corresponding to a desired number of $\eta$-grid lines for the computation mesh.

16. A machine-readable medium according to claim 11, wherein said set of instructions for generating a computation mesh occurs without the need for additional information from the user.

* * * * *